US010313551B2

(12) United States Patent
Shiraishi et al.

(10) Patent No.: US 10,313,551 B2
(45) Date of Patent: Jun. 4, 2019

(54) CONTROL SYSTEM CONFIGURED TO CORRECT VARIATIONS IN OPTICAL OUTPUT OF LIGHT EMITTING DEVICES, IMAGE FORMING SYSTEM, CONTROL METHOD, AND COMPUTER-READABLE RECORDING MEDIUM

(71) Applicants: Naoto Shiraishi, Kanagawa (JP); Shinji Kobayashi, Tokyo (JP)

(72) Inventors: Naoto Shiraishi, Kanagawa (JP); Shinji Kobayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/384,583

(22) Filed: Dec. 20, 2016

(65) Prior Publication Data
US 2017/0201643 A1    Jul. 13, 2017

(30) Foreign Application Priority Data

Jan. 8, 2016   (JP) ................. 2016-002750

(51) Int. Cl.
| | |
|---|---|
| *G03G 15/04* | (2006.01) |
| *H04N 1/29* | (2006.01) |
| *H04N 1/028* | (2006.01) |
| *H04N 1/031* | (2006.01) |
| *H04N 1/407* | (2006.01) |
| *H04N 1/60* | (2006.01) |
| *G03G 15/043* | (2006.01) |

(52) U.S. Cl.
CPC .......... *H04N 1/295* (2013.01); *G03G 15/043* (2013.01); *G03G 15/04054* (2013.01); *H04N 1/02845* (2013.01); *H04N 1/0312* (2013.01); *H04N 1/407* (2013.01); *H04N 1/6008* (2013.01)

(58) Field of Classification Search
CPC ...................................... H01N 1/295
USPC ...................................... 399/4, 53
See application file for complete search history.

(56) References Cited

U.S. PATENT DOCUMENTS

| | | | |
|---|---|---|---|
| 6,504,565 | B1 | 1/2003 | Narita et al. |
| 2002/0021351 | A1 | 2/2002 | Shinohara et al. |

(Continued)

FOREIGN PATENT DOCUMENTS

| | | |
|---|---|---|
| JP | 2000-094742 | 4/2000 |
| JP | 2007-237412 | 9/2007 |

(Continued)

*Primary Examiner* — Quana Grainger
(74) *Attorney, Agent, or Firm* — Harnesss, Dickey & Pierce, P.L.C.

(57) ABSTRACT

A control system controls an image forming unit that includes a charging device, an image bearer to be charged by the charging device, a light-emitting device array including a plurality of light emitting devices, and a driving causing the light emitting devices to emit light to form a latent image on the image bearer. The control system includes a storage unit, a corrector, and a controller. The storage unit is configured to store a light-amount correction value of each of the light emitting devices. The corrector is configured to correct a pixel value of each pixel in image data, based on the light-amount correction value of each light emitting device stored in the storage unit. The controller is configured to control the driver to cause each light emitting device to emit light based on image data for which a pixel value of each pixel has been corrected.

10 Claims, 21 Drawing Sheets

(56) References Cited

U.S. PATENT DOCUMENTS

| | | | |
|---|---|---|---|
| 2002/0024580 A1 | 2/2002 | Kobayashi et al. | |
| 2003/0156179 A1 | 8/2003 | Kobayashi et al. | |
| 2004/0150656 A1 | 8/2004 | Shiraishi | |
| 2004/0262618 A1* | 12/2004 | Oba | G06K 15/1209 257/79 |
| 2005/0246684 A1 | 11/2005 | Shiraishi | |
| 2007/0140721 A1 | 6/2007 | Shinohara et al. | |
| 2007/0206227 A1 | 9/2007 | Inoue et al. | |
| 2007/0242017 A1 | 10/2007 | Mitsuse et al. | |
| 2012/0056547 A1 | 3/2012 | Mitsuse et al. | |
| 2013/0153746 A1 | 6/2013 | Watanabe et al. | |
| 2014/0078563 A1 | 3/2014 | Watanabe et al. | |
| 2014/0226186 A1 | 8/2014 | Shiraishi | |
| 2014/0362395 A1 | 12/2014 | Shiraishi | |
| 2015/0212447 A1* | 7/2015 | Yagi | G03G 15/043 347/118 |
| 2015/0235113 A1 | 8/2015 | Shiraishi | |
| 2016/0277641 A1 | 9/2016 | Shiraishi | |
| 2017/0050447 A1* | 2/2017 | Zengo | B41J 11/002 |

FOREIGN PATENT DOCUMENTS

| | | | |
|---|---|---|---|
| JP | 2007-283597 | | 11/2007 |
| JP | 2008087429 A | * | 4/2008 |
| JP | 2009-023145 | | 2/2009 |
| JP | 2014-177088 | | 9/2014 |

\* cited by examiner

CONTROL SYSTEM CONFIGURED TO CORRECT VARIATIONS IN OPTICAL OUTPUT OF LIGHT EMITTING DEVICES, IMAGE FORMING SYSTEM, CONTROL METHOD, AND COMPUTER-READABLE RECORDING MEDIUM

CROSS-REFERENCE TO RELATED APPLICATION

The present application claims priority under 35 U.S.C. § 119 to Japanese Patent Application No. 2016-002750, filed Jan. 8, 2016. The contents of which are incorporated herein by reference in their entirety.

BACKGROUND OF THE INVENTION

1. Field of the Invention

The present invention relates to a control system, an image forming system, a control method, and a computer-readable recording medium.

2. Description of the Related Art

Conventionally, in an image forming apparatus that prints an image on a recording medium through an image bearer, components that respectively perform charging, exposure, development, and transfer, is provided around the image bearer, and an image forming unit that performs a series of image forming (also referred to as "printing" or "recording") processing including image forming is provided. Moreover, in such an image forming apparatus, a light-emitting device array in which plural light emitting devices such as light emitting diodes (LED) are aligned, for example, in a main scanning direction (also referred to as "line direction") that is perpendicular to a sub-scanning direction is also provided.

In image forming performed by the image forming unit, first, a drum-shaped or a belt-shaped image bearer is uniformly charged by a charging unit. Movement of a drum-shaped image bearer and the like in the sub-scanning direction is also expressed as "rotating" or "turning". Moreover, movement of a belt-shaped image bearer and the like in the sub-scanning direction is also expressed as "rotating". Subsequently, the light-emitting device irradiates a charged surface of the image bearer with light in a line unit in the main scanning direction (hereinafter, simply "line") according to image data, thereby exposing the charged surface. As a result, an electrostatic image (also referred to as "electrostatic latent image") by light emission is written on the charged surface of the image bearer. Subsequently, by developing the electrostatic image with toner, a toner image is formed on the charged surface. The formed toner image is directly transferred onto a recording medium by a transfer unit, or is transferred onto a recording medium after the image is transferred to a belt-shaped or a drum-shaped intermediate transfer body. The recording medium to which the toner image is thus transferred go through a fixing unit to have the toner image fixed thereon, and is, thereafter, ejected out of the apparatus.

Problems that is concerned about when the light-emitting device array is used in the image forming apparatus are variation in optical output of the multiple light emitting diodes in the light-emitting device array caused at the time of manufacturing the light-emitting device array, and non-uniformity in light amount caused by an assembly error and the like of each light emitting device and an equal-magnification image forming device (rod lens array). The nonuniformity in light amount can cause deterioration of an image, and can appear as vertical streaks in an image printed out. Furthermore, deterioration of an image can include an image skew and the like caused by deviation of a main/sub image position due to an assembly error of the light-emitting device array and the image bearer, or inclination of a main scanning line.

Based on such a background, in the light-emitting device array used in an image forming apparatus, a correction function to make the light amount uniform among the light emitting devices is provided therein in some cases. This correction function is as follows. That is, a correction value to make the light amount uniform is calculated in advance for each of the light emitting devices, and light-amount correction data indicating the correction value is stored in a storage unit such as a read-only memory (ROM). By correcting a driving current to be supplied to each of the light emitting device independently, by using the light-amount correction data of each of the light emitting devices, the light amount is equalized (Japanese Unexamined Patent Application Publication No. 2014-177088).

However, by a method of correcting the driving current of each of the light emitting devices independently as in the above conventional technique, it is necessary to provide a digital-analog converter (DAC) that corrects a driving current based on the light-amount correction data independently for each of the light emitting devices, resulting in an increase in device cost. For example, in an image forming apparatus supporting a resolution of 1200 dots per inch (dpi) and an A3 width (297 mm), approximately 14000 pieces of LED devices are provided. Therefore, if a current correction circuit such as a DAC is provided independently for each of the LED devices, a large scale integrated circuit is required to be designed and mounted therein, leading to a significant increase in device cost.

SUMMARY OF THE INVENTION

According to one aspect of the present invention, a control system controls an image forming unit that includes a charging device, an image bearer to be charged by the charging device, a light-emitting device array including a plurality of light emitting devices, and a driving causing the light emitting devices to emit light to form a latent image on the image bearer. The control system includes a light-amount-correction-value storage unit, a light-amount corrector, and a controller. The light-amount-correction-value storage unit is configured to store a light-amount correction value of each of the light emitting devices. The light-amount corrector is configured to correct a pixel value of each pixel in image data, based on the light-amount correction value of each of the light emitting devices stored in the light-amount-correction-value storage unit. The controller is configured to control the driver to cause each of the light emitting devices to emit light based on image data for which a pixel value of each pixel has been corrected by the light-amount corrector.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
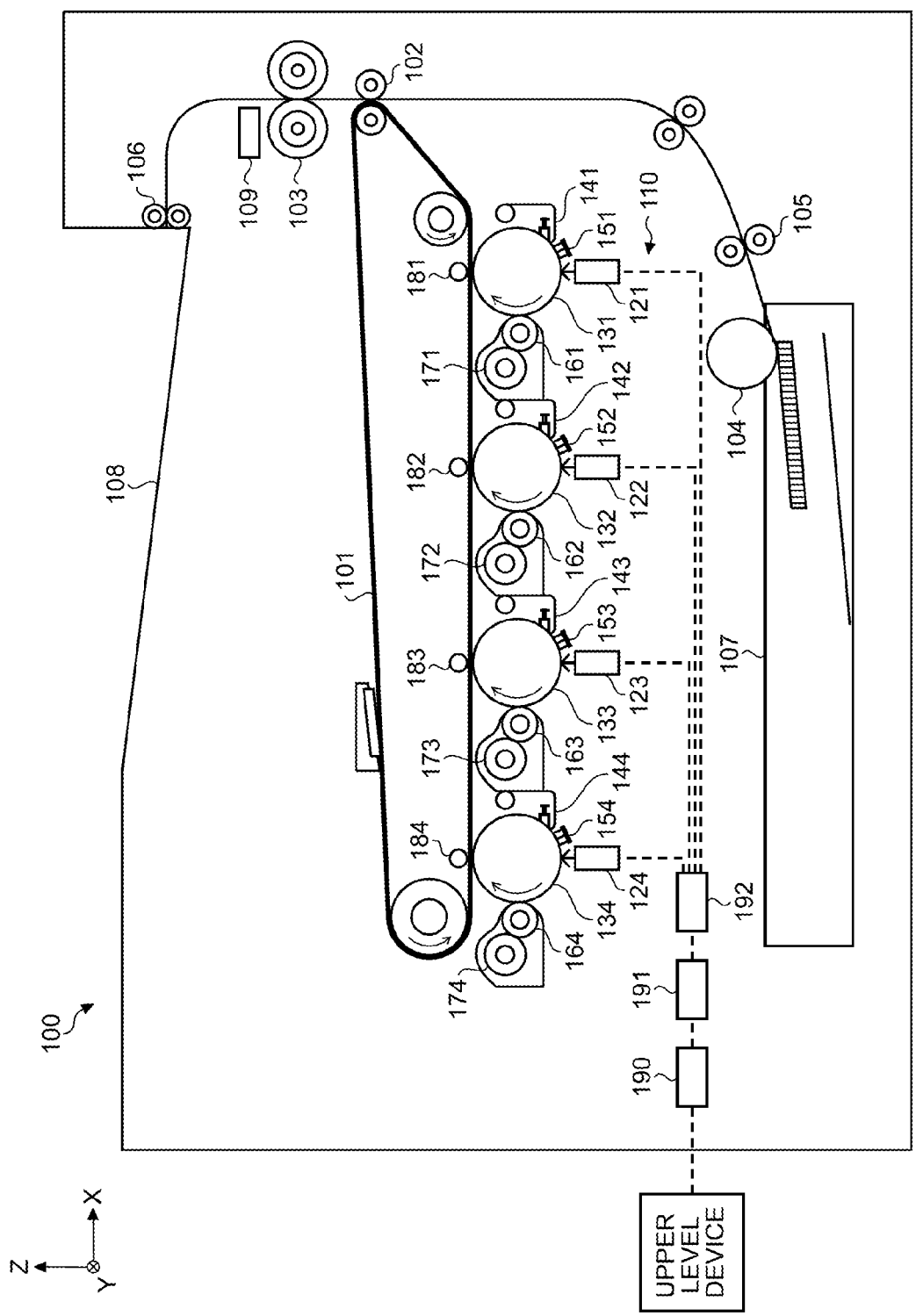
FIG. 1 is a schematic diagram illustrating a schematic configuration example of a color printer as an image forming system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a control system, an image forming system, a control method, and a computer-readable recording medium that enable high quality image forming while suppressing the increase in device cost.

The embodiment below has following features in performing image forming processing. In the following embodiment, image-position correction processing to correct a lean (inclination) of light emitting devices (for example, LED devices) relative to a sheet of paper is performed for a multivalued CMYK image subjected to color conversion. Moreover, in the following embodiment, variations in light amounts among LED devices are corrected by image processing. By thus correcting variations in light amounts per plane by the image processing, it is possible to eliminate necessity to provide a current correction circuit, such as a DAC, independently to each of the LED devices. This enables to omit designing and mounting a large-scale integrated circuit, and therefore, enabling to reduce the device cost. Furthermore, even in a case of mounting a circuit for an electric current, it is possible to reduce the precision thereof, and therefore, enabling to suppress the increase in the device cost.

FIG. 1 is a schematic diagram illustrating a schematic configuration example of a color printer as an image forming system according to the embodiment. In FIG. 1, in a three-dimensional Cartesian coordinate system with an X axis, a Y axis, and a Z axis, it is explained as a direction parallel to a longitudinal direction (rotation axis direction) of a photoconductor drum is the Y axis, and a direction parallel to a direction of arrangement of four photoconductor drums is the X axis.

A color printer 100 illustrated in FIG. 1 is a tandem multi-color printer that forms a full color image by superimposing, for example, four colors of black, yellow, magenta, and cyan. In the example illustrated in FIG. 1, the color printer 100 includes a light source device 110 that has four print heads 121 to 124, four photoconductor drums 131 to 134 each of which is an image bearer, four cleaning units 141 to 144, four charging devices 151 to 154, four developing rollers 161 to 164, four toner cartridges 171 to 174, four first transfer rollers 181 to 184, a transfer belt 101, a second transfer roller 102, a fixing device 103, a paper feeding roller 104, a registration roller pair 105, a paper ejection roller 106, a paper feeding tray 107, a paper ejection tray 108, a printer controller board 190, a printer control device 191 that controls the above components overall, and the like.

The printer controller board 190 controls mutual communication with an upper level device (for example, personal computer) through a network and the like. The printer control device 191 sends image information from the printer controller board 190 to the light source device 110.

The photoconductor drum 131, the print head 121, the charging device 151, the developing roller 161, the toner cartridge 171, the cleaning unit 141, and the first transfer roller 181 are used in a set, and constitute an image forming station that forms a black image (hereinafter, also "K station" for convenience sake).

The photoconductor drum 132, the print head 122, the charging device 152, the developing roller 162, the toner cartridge 172, the cleaning unit 142, and the first transfer roller 182 are used in a set, and constitute an image forming station that forms a yellow image (hereinafter, also "Y station" for convenience sake).

The photoconductor drum 133, the print head 123, the charging device 153, the developing roller 163, the toner cartridge 173, the cleaning unit 143, and the first transfer roller 183 are used in a set, and constitute an image forming station that forms a magenta image (hereinafter, also "M station" for convenience sake).

The photoconductor drum 134, the print head 124, the charging device 154, the developing roller 164, the toner cartridge 174, the cleaning unit 144, and the first transfer roller 184 are used in a set, and constitute an image forming station that forms a cyan image (hereinafter, also "C station" for convenience sake).

The respective photoconductor drums 131 to 134 have a photoconductor layer on a surface thereof. The respective photoconductor drums 131 to 134 rotate in a direction of arrows in the drawing by a rotating mechanism not illustrated. In the following, the four photoconductor drums 131 to 134 are also referred to as a photoconductor drum 130 when it is not necessary to distinguish each.

The respective charging devices 151 to 154 charge the surface of the corresponding photoconductor drums 131 to 134 uniformly. The light source device 110 irradiates the surface of the corresponding charged photoconductor drums 131 to 134 with lights modulated for each color based on multicolor image information (black image information, yellow image information, magenta image information, cyan image information) from the printer control device 191. Thus, on the surfaces of the photoconductor drums 131 to 134, latent images corresponding to the image information are formed. The latent images formed at this point move toward the direction of the corresponding developing rollers 161 to 164 with rotation of the photoconductor drums 131 to 134.

To the respective developing rollers 161 to 164, toner from the corresponding toner cartridges 171 to 174 is applied uniformly and thinly on surfaces thereof with rotation. Upon coming into contact with the surface of the corresponding photoconductor drums 131 to 134, the toner on the surfaces of the developing rollers 161 to 164 is transferred onto the surfaces only at a portion on which the light has been irradiated, and adheres thereon. That is, the respective developing rollers 161 to 164 apply toner to be adhered onto the latent images formed on the surfaces of the corresponding photoconductor drums 131 to 134 to make the images appear. The images on which the toner adheres (toner image) move toward a direction of the transfer belt 101 with rotation of the photoconductor drums 131 to 134.

The respective toner images of black, yellow, magenta, and cyan are sequentially transferred onto the transfer belt 101 on which a bias voltage is applied, through the corresponding first transfer rollers 181 to 184 at predetermined timing, and superimposed with each other to form a multicolor image.

In the paper feeding tray 107, recording paper is stored. Near this paper feeding tray 107, the paper feeding roller 104 is arranged, and the paper feeding roller 104 takes out the recording paper from the paper feeding tray 107 one by one, and conveys it to the registration roller pair 105. The registration roller pair 105 sends the recording paper toward a gap between the transfer bel 101 and the second transfer roller 102 on which a bias voltage is applied at predetermined timing. Thus, the color image on the transfer bel 101 is transferred onto the recording paper. The recording paper on which the color image is transferred is sent to the fixing device 103.

The fixing device 103 applies heat and pressure to the recording paper, and thus the toner is fixed on the recording paper. The recording paper on which the toner is fixed herein is sent to the paper ejection tray 108 through the paper ejection roller 106, and is stacked sequentially on the paper ejection tray 108.

The respective cleaning units 141 to 144 remove toner (residual toner) that remains on the surface of the corresponding photoconductor drums 131 to 134. The surfaces of the photoconductor drums 131 to 134 from which the residual toner has been removed return back to positions to oppose to the corresponding charging devices 151 to 154 again.

Figure 2:
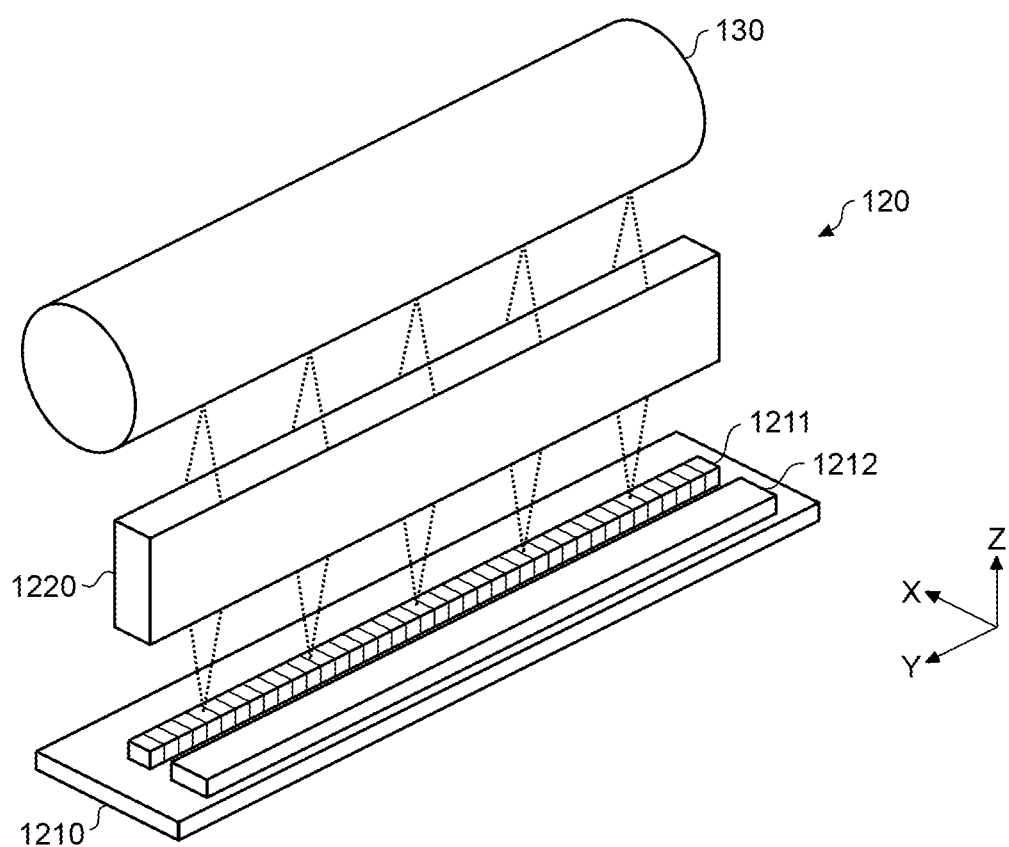
FIG. 2 is a perspective view illustrating a schematic configuration example of each print head and a photoconductor drum illustrated in FIG. 1.
Figure 3:
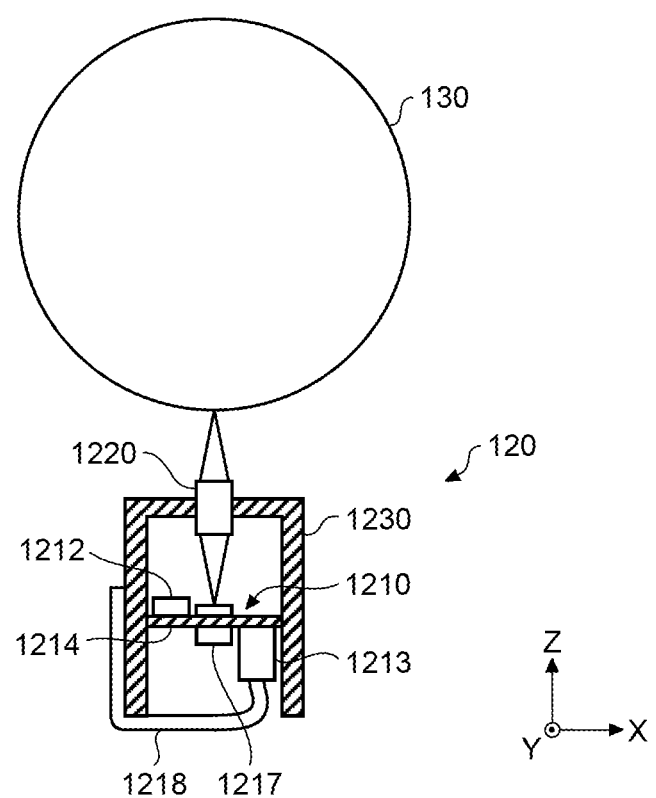
FIG. 3 is a cross-section illustrating a schematic configuration example of each of the print head and the photoconductor drum illustrated in FIG. 1.
Figure 4:
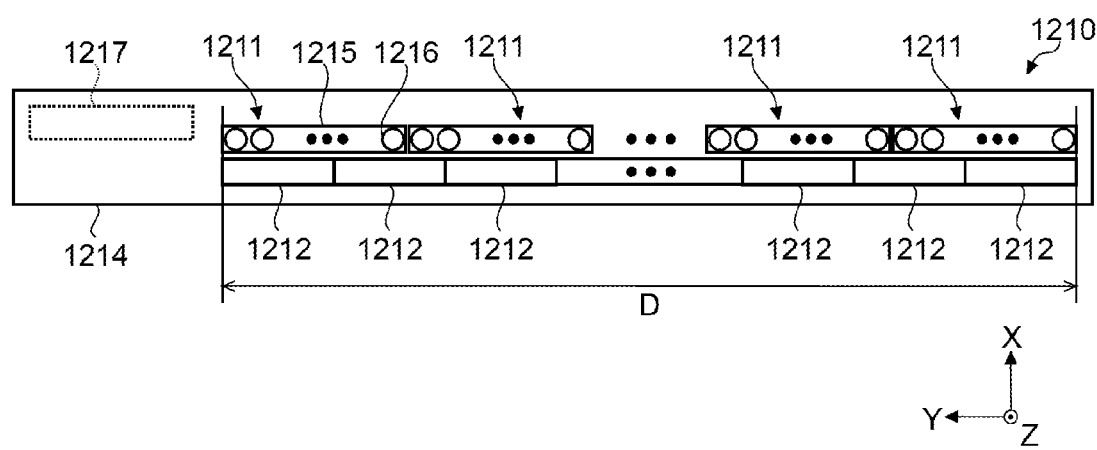
FIG. 4 is a schematic diagram illustrating a schematic configuration example of an LED array chip illustrated in FIG. 2 and FIG. 3.
Figure 5:
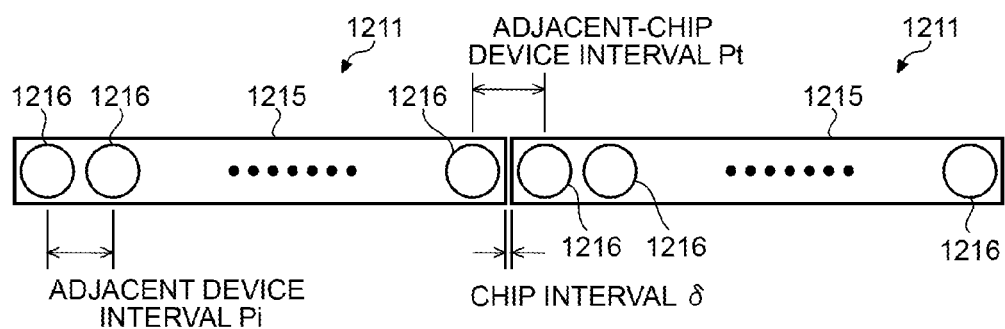
FIG. 5 is a partial enlarged view of the LED array chip illustrated in FIG. 4.

FIG. 2 and FIG. 3 illustrate a schematic configuration example of each of print heads and the photoconductor drums illustrated in FIG. 1. FIG. 4 and FIG. 5 illustrate a schematic configuration example of an LED array chip illustrated in FIG. 2 and FIG. 3. FIG. 5 is a partial enlarged view of the LED array chip illustrated in FIG. 4. In the following, four print heads 121 to 124 are also referred to as a print head 120 when it is not necessary to distinguish each.

As illustrated in FIG. 2 and FIG. 3, each of the print heads 120 includes, for example, an LED device 1210, a rod lens array 1220, a housing 1230, and the like.

The housing 1230 has, for example, an upper wall, and is structured with a box member having a substantially rectangular parallelepiped shape that opens in a −Z side. In the housing 1230, the LED device 1210 is stored. Therefore, it is preferable that a material having a conductivity to shield an electrical disturbance noise (for example, a high voltage noise from a corresponding charging device) from an external unit be used for the housing 1230. This material can be one made of a material having a conductivity, or one processed by surface treatment giving a conductivity. Thus, noise immunity can be improved.

The LED device 1210 includes, for example, multiple LED array chips 1211, multiple driving integrated circuits (ICs) 1212, a cable connection connector 1213, and a first board 1214 on which these components are mounted. For the first board 1214, for example, a long and narrow print board, the main ingredient of which is glass epoxy is used.

As illustrated in FIG. 4, the multiple LED array chips 1211 are arranged on the first board 1214 in a Y axis direction. Each of the LED array chips 1211 includes a second board 1215, and multiple LED devices (light emitting diode devices) 1216 that are aligned on the second board 1215 in the Y axis direction. That is, the LED devices 1216 are arrange in the Y axis direction. Each of the Led devices 1216 corresponds to one pixel.

Specifically, on the first board 1214, multiple pieces (for example, about several tens to several hundreds) of the second boards 1215 are arranged in the Y axis direction so as to correspond to an image writing width W (width of the effective writing area) in the Y axis direction, that is, so as to cover an entire effective writing area. On each of the second boards 1215, multiple pieces (for example, about several tens to several hundreds) of the LED devices 1216 are arranged at predetermined intervals Pi (hereinafter, also referred to as "adjacent device interval Pi") in the Y axis direction (refer to FIG. 5).

Specifically, the second boards 1215 are mounted on the first board 1214 such that a space between two pieces of the LED devices 1216 positioned respectively at adjacent two ends of the adjacent two units of the second boards 1215, that is, a space between the LED device 1216 of one board positioned closest to the other board and the LED device 1216 of the other board positioned closest to the one board (hereinafter, referred to as "adjacent-chip device interval Pt") is equal to the adjacent device interval Pi. That is, all of the LED devices 1216 are arranged at regular intervals (Pi) in the Y axis direction. The width of the second board 1215 of each of the LED array chips 1211 in the Y axis direction is to be a standard width that is set in manufacturing so as to maximize the number of pieces obtainable from a wafer.

The LED device 1216 are mounted on the first board 1214 at intervals enabling to form an image at a desired pixel density (resolution) through the second boards 1215. Specifically, when the resolution is, for example, 600 dpi, it is required to set both the adjacent device interval Pi and the adjacent-chip device interval Pt to 42.3 micrometers (μm). Similarly, when the resolution is, for example, 1200 dpi, it is required to set both the intervals Pi and Pt to 21.2 μm.

More specifically, to write in an A4 width (210 mm) at the resolution of 600 dpi, it is required to arrange 4960 pieces of the LED devices 1216 in the Y axis direction at the intervals of 42.3 μm (=Pi=Pt). In this case, it is necessary to mount, for example, 50 pieces of the LED array chips 1211 having 100 pieces of the LED device 1216. Similarly, to write in an A3 width (297 mm) at the resolution of 1200 dpi, it is necessary to mount about 14000 pieces of the LED devices 1216 in the Y axis direction, and it is necessary to mount, for example, 140 pieces of the LED array chips 1211 having 100 pieces of the LED devices 1216.

Symbol D in FIG. 4 signifies a full exposure width of the print head 120. The full exposure width D is set to a value obtained by adding an amount corresponding to a margin (registration adjustment width, assembly error) in the Y axis direction to the image writing width W. Specifically, when an image in A3 size is formed, it is preferable to set the image writing width W=297 mm and the full exposure width D=302 mm or more (image writing width W+5 mm or more). "More" means a width of an integral multiple of the standard width, as the width in the Y axis direction of the second board 1215 of the LED array chip 1211 is the standard width as described above.

As described above, the first board 1214 on which the LED array chips 1211 are mounted is positioned relative to the housing 1230 such that the emission direction of each of the LED devices 1216 is substantially +Z direction, and the longitudinal direction is the Y axis direction.

The plural driver ICs 1212 are mounted, for example, on the −X side of the LED array chips 1211, aligned in the Y axis direction, on the +Z side on a surface of the first board 1214. Each of the driver ICs 1212 has plural driving transistors (not illustrated) that drive the LED devices 1216 independently.

The cable connection connector 1213 is a connector to which a transmission cable 1218 to connect the control device 192 and the LED device 1210 is connected. This cable connection connector 1213 is mounted, for example, on a surface (surface on the −Z side) opposite to the surface (surface on the +Z side) on which the LED array chips 1211 are mounted on the first board 1214.

The rod lens array 1220 is engaged in a through hole that is formed in the upper wall of the housing 1230 as illustrated in FIG. 3.

Figure 6:
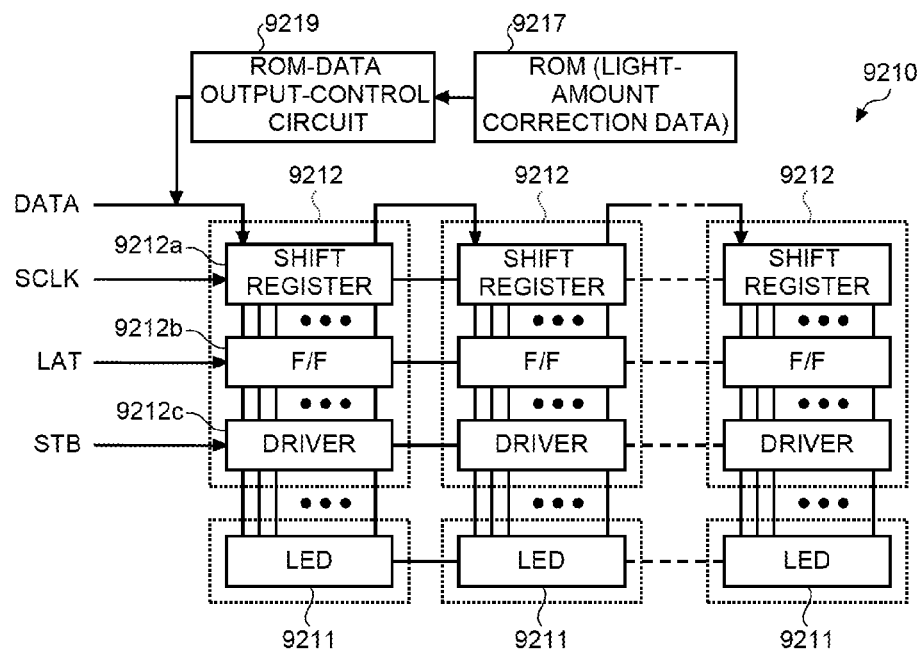
FIG. 6 is a block diagram illustrating an electrical internal block of an LED device that has a light-amount correction function.
Figure 7:
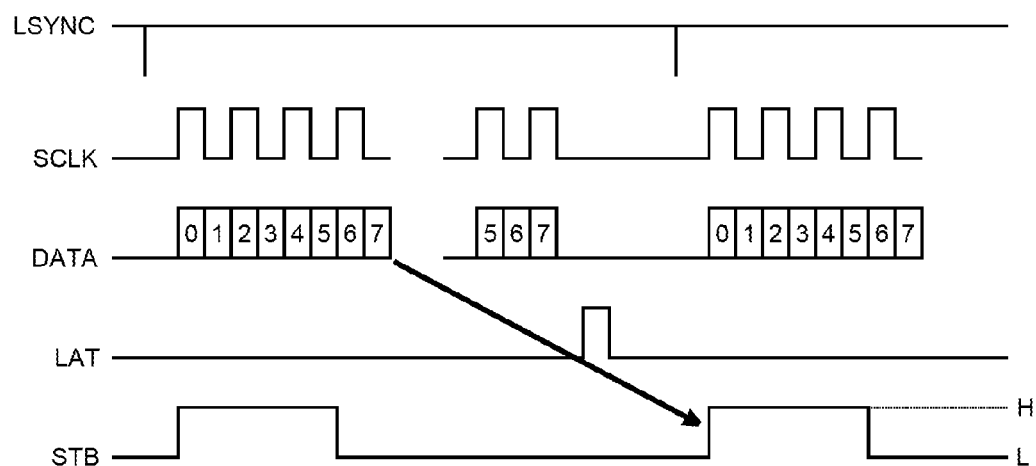
FIG. 7 is a timing chart illustrating operation when the LED array chip illustrated in FIG. 6 exposes image data.

A case in which the LED device has a light-amount correction function is explained herein. FIG. 6 illustrates an electrical internal block of the LED device that has the light-amount correction function. FIG. 7 illustrates a timing chart of operation when the LED array chip illustrated in FIG. 6 exposes image data.

As illustrated in FIG. 6, an LED device 9210 includes a ROM 9217 that stores light-amount correction data for each of LED device 9216 (refer to FIG. 8), a ROM-data output-control circuit 9219 that controls read of the light-amount correction data from the ROM 9217, and a driver IC 9212 that is provided for each of LED array chips 9211. Each of the driver IC 9212 includes a shift register 9212a, a flip-flop (F/F) 9212b, and a driver 9212c.

In the operation of the LED device 9210, as illustrated in FIG. 7, image data DATA to be printed and a SCLK signal to transfer the image data DATA to a position in a desired arrangement direction are given to the shift register 9212a in the driver IC 9212. The image data DATA that has been transferred to the desired position by the shift register 9212a is held by a LAT signal of the F/F 9212b in the subsequent stage. The driver 9212c performs exposure by lighting the LED array chip 9211 for a period in which the STB signal is "H" based on the image data DATA held by the LAT signal. Note that by varying the period in which the STB signal is "H", the magnitude of exposure light amount can be adjusted.

Figure 8:
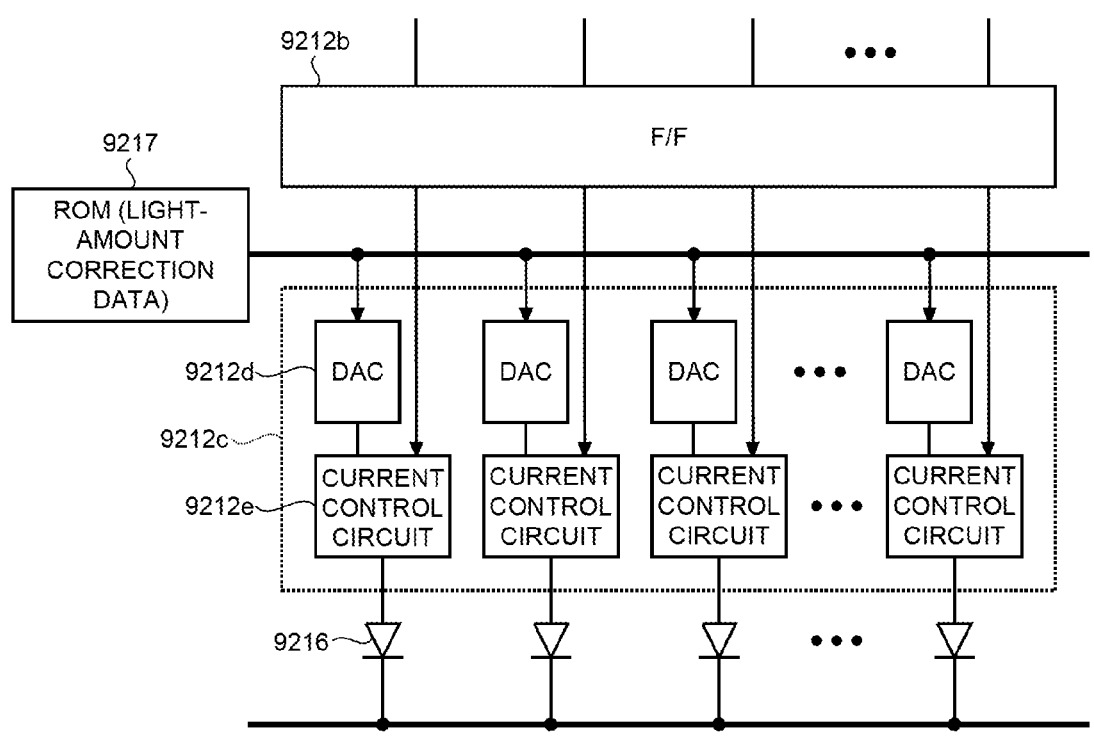
FIG. 8 is a block diagram illustrating a schematic configuration example of a driver in which light-amount correction data is set.

Moreover, in the ROM 9217, light-amount correction data to correct variations in light amount of each of the LED devices of each of the LED array chips 9211 is stored. The light-amount correction data can be acquired, for example, by measuring a light amount of all of the LED devices of the LED array chip 9211 at the time of manufacturing or the like of the LED device 9210. The light-amount correction data thus acquired is stored in the ROM 9217 in advance, and is read by the ROM-data output-control circuit 9219, for example, at the time of turning on the image forming apparatus, to be set to the driver 9212c of each of the LED array chips 9211. FIG. 8 illustrates a schematic configuration example of the driver to which the light-amount correction data is set.

As illustrated in FIG. 8, the driver 9212c includes a DAC 9212d and a current control circuit 9212e for each of the LED device 9216. To each of the current control circuit 9212e, the light-amount correction data of each pixel (the LED device 9216) read from the ROM 9217 is input after converted into an analog signal by the DAC 9212d. To each of the current control circuit 9212e, the image data DATA corresponding to each pixel (the LED device 9216) is also input through the F/F 9212*b*. Each of the current control circuit 9212*e* applies an electric current to the corresponding LED device 9216 based on a voltage value that is obtained by correcting a voltage value corresponding to the input image data with the light-amount correction data that has been subjected to analog conversion. Thus, variations in light amount of the LED devices 9216 are corrected.

However, as an independent unit of the DAC 9212*d* is necessary for each of the LED devices 9216, the method illustrated in FIG. 8 results in increase in the device cost. For example, for the A3 width (297 mm) at the resolution of 1200 dpi, the DAC 9212*d* is necessary for each of about 14000 pieces of LEDs. Therefore, a large-scale circuit is required to be integrated, and the device cost significantly increases.

Therefore, in the embodiment, a configuration not requiring independent DACs for the LED devices is explained below with reference to the drawings.

Figure 9:
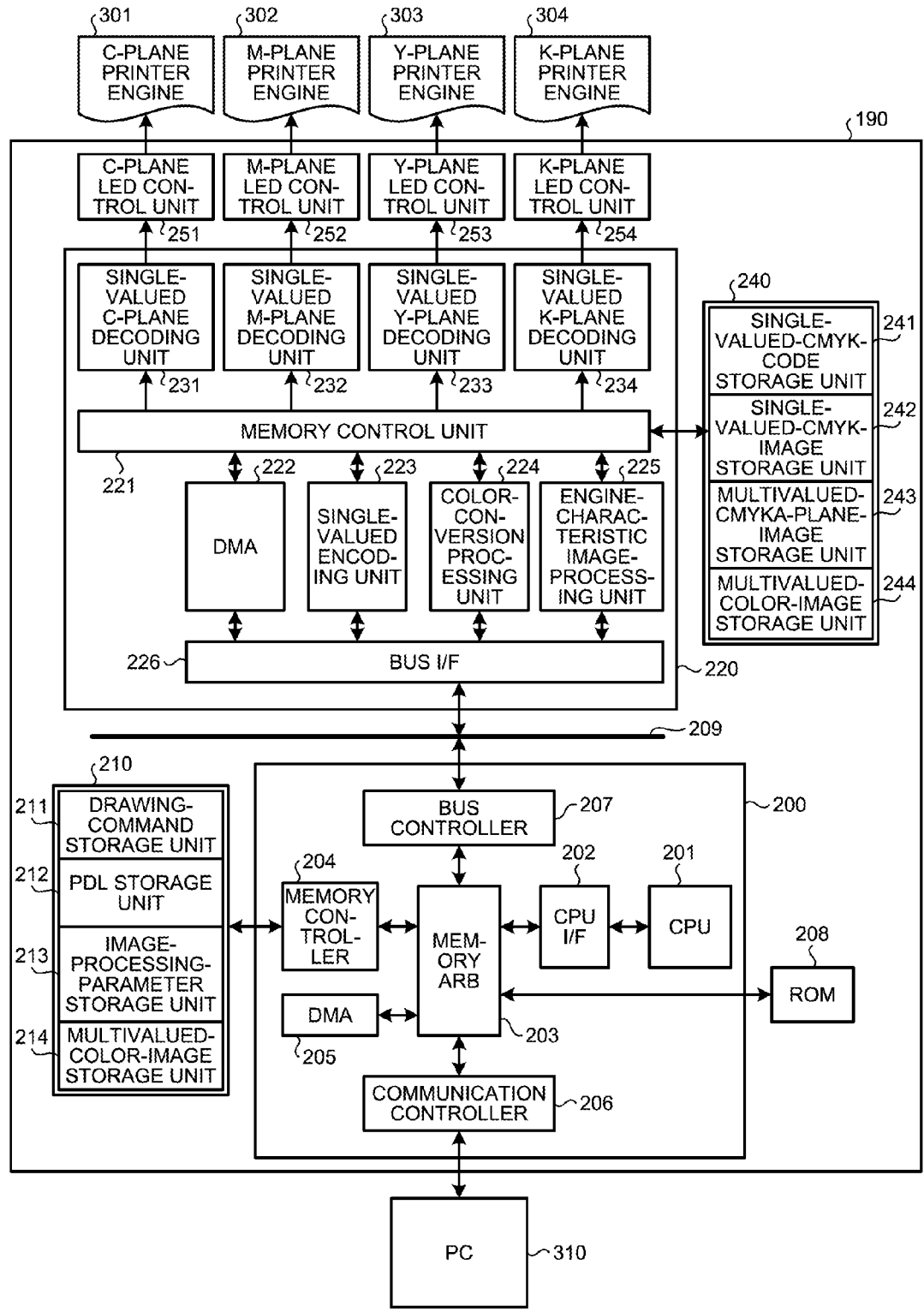
FIG. 9 is a block diagram illustrating a schematic configuration example of a printer controller board according to the embodiment.

FIG. 9 is a block diagram illustrating a schematic configuration example of a printer controller board according to the embodiment. As illustrated in FIG. 9, the printer controller board 190 includes a CPU module 200, a ROM 208, a main memory 210, an image processing controller 220, an image memory 240, and LED control units 251 to 254 of CMYK planes, respectively. The CPU module 200 and the image processing controller 220 are connected, for example, through a bus 209.

The CPU module 200 includes a CPU 201, a CPU interface (I/F) 202, a memory arbiter (ARB) 203, a memory controller 204, a direct memory access (DMA) 205, a communication controller 206, and a bus controller 207.

The CPU 201 performs overall control of the printer controller board 190, analysis of a page description language (PDL) that is received from a personal computer (PC) 310 through the communication controller 206, generation of a drawing command based on an analysis result of PDL, generation of a multivalued color image based on a result of generation of the drawing command, and the like.

The CPU I/F 202 is an interface of the CPU 201, and connects the CPU 201 to the ROM 208, and various kinds of controllers through the memory arbiter 203. The memory arbiter 203 performs arbitration with the ROM 208 and various kinds of controllers.

The memory controller 204 controls the main memory 210, and is connected to various kinds of controllers and the CPU 201 through the memory arbiter 203.

The DMA 205 performs direct memory access with the image processing controller 220 that is connected through the memory controller 204 and the bus 209. The bus controller 207 performs arbitration of the bus 209 among respective components connected through the bus 209.

The communication controller 206 is connected to a network, and receives various kinds of data, commands, and the like from an external device such as the PC 310 through the network. Furthermore, the communication controller 206 is connected to respective controllers through the memory arbiter 203.

The ROM 208 stores various kinds of programs and font information such as characters, and the like.

The main memory 210 includes a drawing-command storage unit 211 that stores drawing commands, a PDL storage unit 212 that stores PDL, an image-processing-parameter storage unit 213 that stores image processing parameters used in a color-conversion processing unit 224 of the image processing controller 220 and an engine-characteristic image-processing unit 225 described later, and a multivalued-color-image storage unit 214 that stores image data of multivalued color (hereinafter, "multivalued color image"). The main memory 210 can store programs that is executed by the CPU 201.

On the other hand, the image processing controller 220 includes a memory control unit 221, a DMA 222, a single-valued encoding unit 223, a color-conversion processing unit 224, the engine-characteristic image-processing unit 225, a bus I/F 226, a single-valued C-plane decoding unit 231, a single-valued M-plane decoding unit 232, a single-valued Y-plane decoding unit 233, and a single-valued K-plane decoding unit 234.

This image processing controller 220 is constituted of, for example, an application specific integrated circuit (ASIC), or the like, and reads a multivalued color image that is stored in the main memory through the bus I/F 226. Moreover, the image processing controller 220 transfer read multivalued color image to the image memory 240, and performs image reading processing of the multivalued color image. Furthermore, the image processing controller 220 controls the LED control units 251 to 254 of the respective CMYK planes, thereby performing print processing by the printer engines 301 to 304 of the respective CMYK planes.

Figure 10:
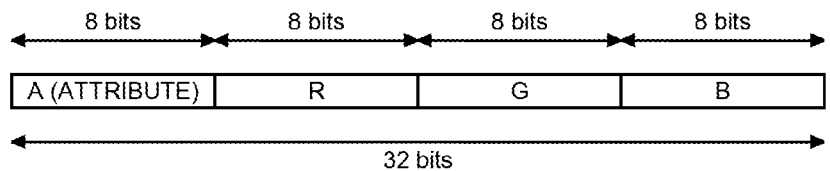
FIG. 10 illustrates an image memory format in a multi-valued-color-image storage unit of an image memory.
Figure 11:
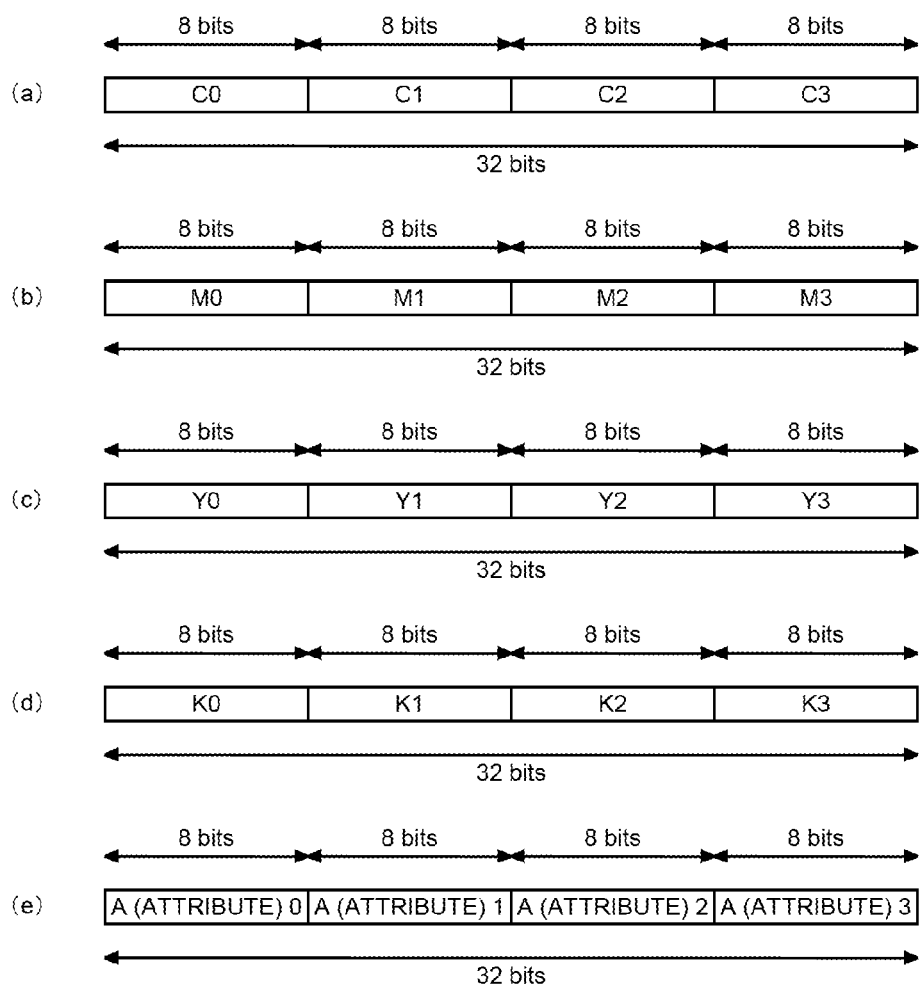
FIG. 11 illustrates an image memory format of each plane of CMYK in a multivalued-CMYKA-plane-image storage unit of the image memory.
Figure 12:
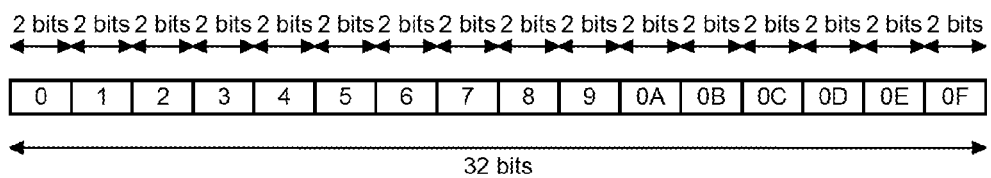
FIG. 12 illustrates an image memory format common among CMYK planes in a single-valued-CMYK image storage unit of the image memory.

Various kinds of image memory formats of the image memory 240 are explained herein. FIG. 10 illustrates an image memory format in the multivalued-color-image storage unit of the image memory. In FIG. 11, (a) to (e) illustrate image memory formats of respective planes of CMYK in a multivalued-CMYKA-plane-image storage unit of the image memory. In FIG. 11, (a) illustrates an image memory format of a C plane; (b) illustrates an image memory format of an M plane; (c) illustrates an image memory format of a Y plane; (d) illustrates an image memory format of a K plane; and (e) illustrates an image memory format of attribute (A). FIG. 12 illustrates an image memory format common among CMYK planes in a single-valued-CMYK-image storage unit of the image memory.

As illustrated in FIG. 10, the image memory format of a multivalued color image stored in a multivalued-color-image storage unit 244 is an image format of pixels (dot sequence) of color information of RGB and attribute information (A). As illustrated in (a) to (e) in FIG. 11, the image memory format of multivalued plane-images of respective planes of CMYKA (also referred to as multivalued-CMYKA plane images) stored in a multivalued-CMYKA-plane-image storage unit 243 is an image format of planes (frame sequential) of color information of the respective planes of CMYK and attribute information (A). As illustrated in FIG. 12, an image memory format of single-valued plane images of the respective planes of CMYK (also referred to as single-valued CMYK images) stored in a single-valued-CMYK-image storage unit 242 is an image format of plane (frame sequential) of color information of the respective planes of CMYK. Note that the term "single-valued" may be restated as "less-valued" or "few-valued" with respect to "multivalued".

Referring back to FIG. 9, explanation is continued. The memory control unit 221 of the image processing controller 220 controls the image memory 240, to support a request for memory access to the image memory 240 from the engine-characteristic image-processing unit 225, the color-conversion processing unit 224, the single-valued encoding unit 223, the single-valued decoding units 231 to 234 of the respective planes of CMYK, and the DMA 222. The image memory 240 includes the multivalued-color-image storage unit 244 that stores multivalued color images of RGB, the multivalued-CMYKA-plane-image storage unit 243 that stores multivalued-CMYKA plane images, the single-valued-CMYK-image storage unit 242 that stores single-valued plane images of the respective planes of CMYK (also referred to as single-valued CMYK images), and a single-valued-CMYK-code storage unit 241 that stores single-valued CMYK codes.

The bus I/F 226 connects the image processing controller 220 to the CPU module 200 through the bus 209.

The DMA 222 reads a multivalued color image from the multivalued-color-image storage unit 214 of the main memory 210, and transfers the read multivalued color image to the multivalued-color-image storage unit 244 of the image memory 240.

The engine-characteristic image-processing unit 225 reads a multivalued-CMYKA plane image stored in the multivalued-CMYKA-plane-image storage unit 243 of the image memory 240, and performs image position correction processing, light amount correction, and toning processing for each plane. Moreover, the engine-characteristic image-processing unit 225 transfers a single-valued CMYK image that is obtained by performing the toning processing to the single-valued-CMYK-image storage unit 242 of the image memory 240.

The color-conversion processing unit 224 reads a multivalued color image from the multivalued-color-image storage unit 244 of the image memory 240, and performs color conversion processing of each plane. Furthermore, the color-conversion processing unit 224 transfers a multivalued-CMYKA plane image that is obtained by performing the color conversion processing to the multivalued-CMYKA-plane-image storage unit 243 of the image memory 240.

The single-valued encoding unit 223 reads a single-valued CMYK image from the single-valued-CMYK-image storage unit 242 of the image memory 240, and performs encoding processing of each plane. Moreover, the single-valued encoding unit 223 transfers a single-valued CMYK code that is obtained by performing the encoding processing to the single-valued-CMYK-code storage unit 241 of the image memory 240. The encoding processing by the single-valued encoding unit 223 can be encoding processing by a method enabling reversible compression of a single-valued image such as JBIG.

The single-valued C-plane decoding unit 231 reads a code of a single-valued C plane from the single-valued-CMYK-code storage unit 241 of the image memory 240, and performs decoding of the read code. Furthermore, the single-valued C-plane decoding unit 231 transfers a color value of the C plane acquired by decoding to the C-plane LED control unit 251. The C-plane LED control unit 251 controls the C-plane printer engine 301 that is the printer engine of the C plane, thereby performing print processing of the C plane.

The single-valued M-plane decoding unit 232 reads a code of a single-valued M plane from the single-valued-CMYK-code storage unit 241 of the image memory 240, and performs decoding of the read code. Furthermore, the single-valued M-plane decoding unit 232 transfers a color value of the M plane acquired by decoding to the M-plane LED control unit 252. The M-plane LED control unit 252 controls the M-plane printer engine 302 that is the printer engine of the M plane, thereby performing print processing of the M plane.

The single-valued Y-plane decoding unit 233 reads a code of a single-valued Y plane from the single-valued-CMYK-code storage unit 241 of the image memory 240, and performs decoding of the read code. Furthermore, the single-valued Y-plane decoding unit 233 transfers a color value of the Y plane acquired by decoding to the Y-plane LED control unit 253. The Y-plane LED control unit 253 controls the Y-plane printer engine 303 that is the printer engine of the Y plane, thereby performing print processing of the Y plane.

The single-valued K-plane decoding unit 234 reads a code of a single-valued K plane from the single-valued-CMYK-code storage unit 241 of the image memory 240, and performs decoding of the read code. Furthermore, the single-valued K-plane decoding unit 234 transfers a color value of the K plane acquired by decoding to the K-plane LED control unit 254. The K-plane LED control unit 254 controls the K-plane printer engine 304 that is the printer engine of the K plane, thereby performing print processing of the K plane.

Decoding by the single-valued decoding units 231 to 234 of the respective planes of CMYK can be decoding by a method enabling reversible compression of a single-valued image such as JBIG. The PC 310 that is connected to the printer controller board 190 through a network creates PDL for a print operation of a user.

Figure 13:
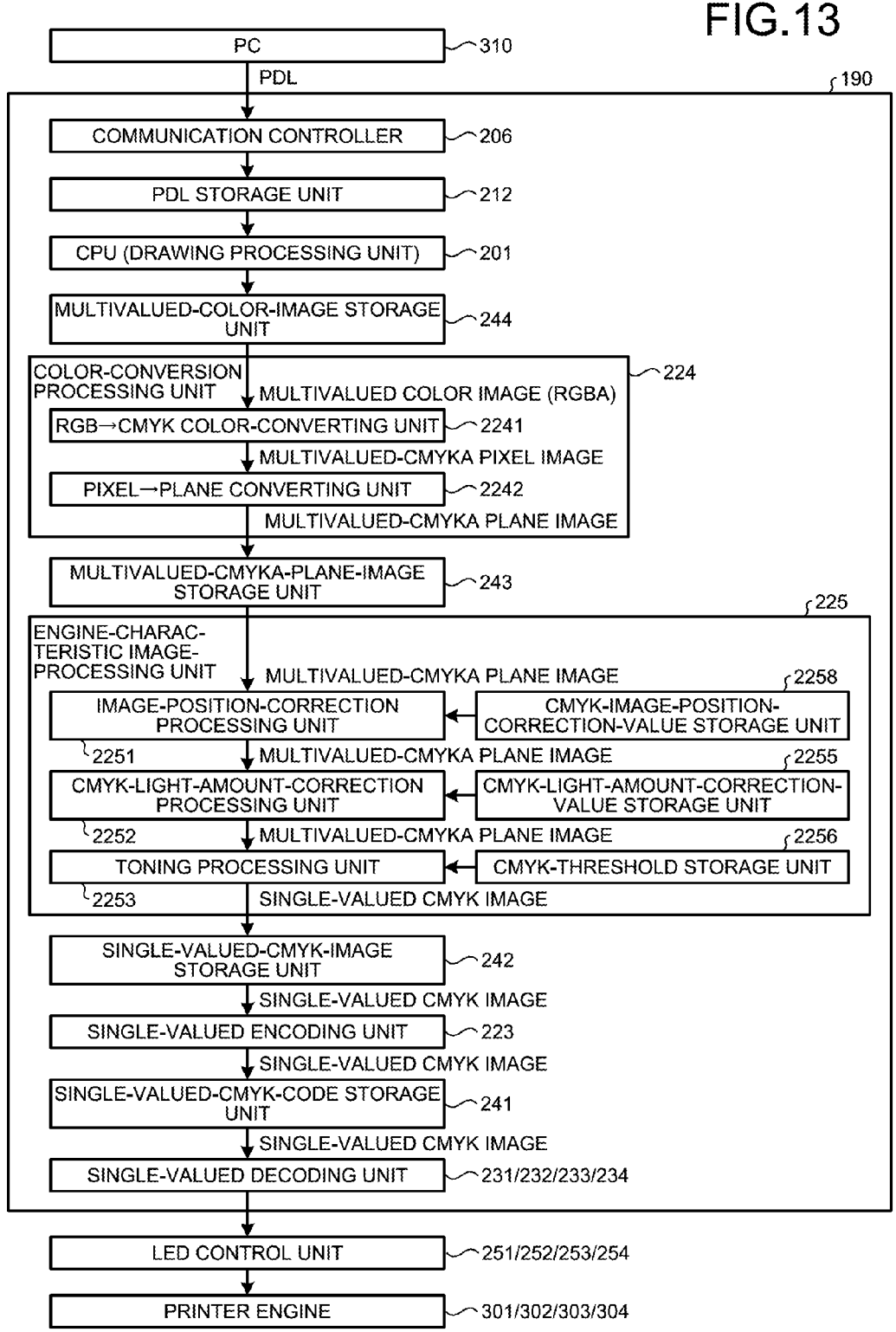
FIG. 13 is a flowchart illustrating a flow of data in printing operation according to the embodiment.

Next, operation of the color printer 100 according to the embodiment is explained. FIG. 13 is a flowchart illustrating a flow of data in printing operation according to the embodiment.

As illustrated in FIG. 13, PDL created by the PC 310 is transferred to the communication controller 206 of the CPU module 200. The communication controller 206 stores the received PDL in the PDL storage unit 212 of the main memory 210. The CPU 201 analyzes the PDL stored in the PDL storage unit 212 to draw a multivalued color image in the multivalued-color-image storage unit 214 of the main memory 210, and transfers the drawn multivalued color image to the multivalued-color-image storage unit 244 of the image memory 240 through the DMA 222. As a result, color values of respective pixels are stored in the multivalued-color-image storage unit 244 of the image memory 240.

The color-conversion processing unit 224 includes an RGB→CMYK color-converting unit 2241 and a pixel-→plane converting unit 2242. The RGB→CMYK color-converting unit 2241 reads a multivalued color image (multivalued RGBA) from the multivalued-color-image storage unit 244 of the image memory 240, and performs color conversion processing of the read multivalued color image. Moreover, the RGB→CMYK color-converting unit 2241 transfers a multivalued-CMYKA pixel image that is obtained by the color conversion processing to the pixel-→plane converting unit 2242.

The pixel→plane converting unit 2242 performs pixel-→plane conversion processing of the multivalued-CMYKA pixel image received from the RGB→CMYK color-converting unit 2241. Furthermore, the pixel→plane converting unit 2242 transfers an acquired multivalued-CMYKA plane image to the multivalued-CMYKA-plane-image storage unit 243 of the image memory 240. Thus, the multivalued-CMYKA plane image is stored in the multivalued-CMYKA-plane-image storage unit 243.

The engine-characteristic image-processing unit 225 includes an image-position-correction processing unit 2251, a CMYK light-amount-correction processing unit 2252, and a toning processing unit 2253. The image-position-correction processing unit 2251 receives a multivalued-CMYKA plane image from the multivalued-CMYKA-plane-image storage unit 243, and performs rotation processing by an angle specified for received each plane image. In this rotation processing, an image is rotated based on the inclination of the LED array chip 1211 relative to the photoconductor drum 130 of each plane. Moreover, the image-position-correction processing unit 2251 also corrects an offset of respective pixels in image data and the LED devices 1216 as necessary. The rotation angles of images of the respective CMYK planes and an image position correction value for an offset are input from a CMYK image-position-correction-value storage unit 2258. By the image-position correction processing including such rotation processing and offset adjustment processing, a position of each of the LED devices 1216 on each of the LED array chips 1211 and a position of each pixel in each image can be matched. Thus, it is possible to suppress image deterioration caused by the LED array chip 1211 being inclined relative to the photoconductor drum 130. Details of the image-position correction processing are described later. Moreover, the image-position-correction processing unit 2251 transfers a multivalued-CMYKA plane image subjected to the image-position correction processing to the CMYK light-amount-correction processing unit 2252.

The engine-characteristic image-processing unit 225 performs CMYK-light-amount correction processing in the multivalued-CMYKA plane image received from the image-position-correction processing unit 2251. The light-amount correction values of the respective planes of CMYK are input from the CMYK-light-amount-correction-value storage unit 2255. The CMYK light-amount-correction processing unit 2252 transfers a multivalued-CMYKA plane image subjected to the CMYK-light-amount correction processing to the toning processing unit 2253.

The toning processing unit 2253 of the engine-characteristic image-processing unit 225 performs toning processing on the multivalued-CMYKA plane image received from the CMYK light-amount-correction processing unit 2252. Moreover, the engine-characteristic image-processing unit 225 transfers a color value of each pixel of the acquired single-valued CMYK image to the single-valued-CMYK-image storage unit 242 of the image memory 240. Thus, a single-valued CMYK image subjected to the toning processing is stored in the single-valued-CMYK-image storage unit 242 of the image memory 240. A threshold matrix of the respective planes of CMYK used in the toning processing, and the like are input from a CMYK-threshold storage unit 2256.

The single-valued encoding unit 223 reads a single-valued CMYK image subjected to the toning processing stored in the single-valued-CMYK-image storage unit 242 of the image memory 240, and encodes a color value of each pixel of the read single-valued CMYK image. Furthermore, the single-valued encoding unit 223 transfers a single-valued CMYK code acquired by encoding to the single-valued-CMYK-code storage unit 241 of the image memory 240. Thus, a single-valued CMYK code is stored in the single-valued-CMYK-code storage unit 241 of the image memory 240.

The single-valued decoding units 231 to 234 of the respective planes of CMYK synchronize with the corresponding printer engine among the printer engines 301 to 304 of the respective planes of CMYK, and read a single-valued CMYK code stored in the single-valued-CMYK-code storage unit 241. Moreover, the single-valued decoding units 231 to 234 of the respective planes of CMYK transfers a color value of each pixel of the small-valued CMYK image subjected to the toning processing that is generated by the decoding processing to a corresponding LED control unit among the LED control units 251 to 254 of the respective planes of CMYK.

The LED control units 251 to 254 transfer the color value of each pixel of the single-valued CMYK image that has been subjected to the toning processing received from the single-valued decoding units 231 to 234 corresponding respectively, to a corresponding printer engine among the printer engines 301 to 304 of the respective planes of CMYK. The printer engines 301 to 304 of the respective planes of CMYK drive the LED device 1216 of the LED array chip 1211 based on the color value received from the LED control units 251 to 254 corresponding respectively, thereby sequentially printing the image data of the respective planes of CMYK.

Figure 14:
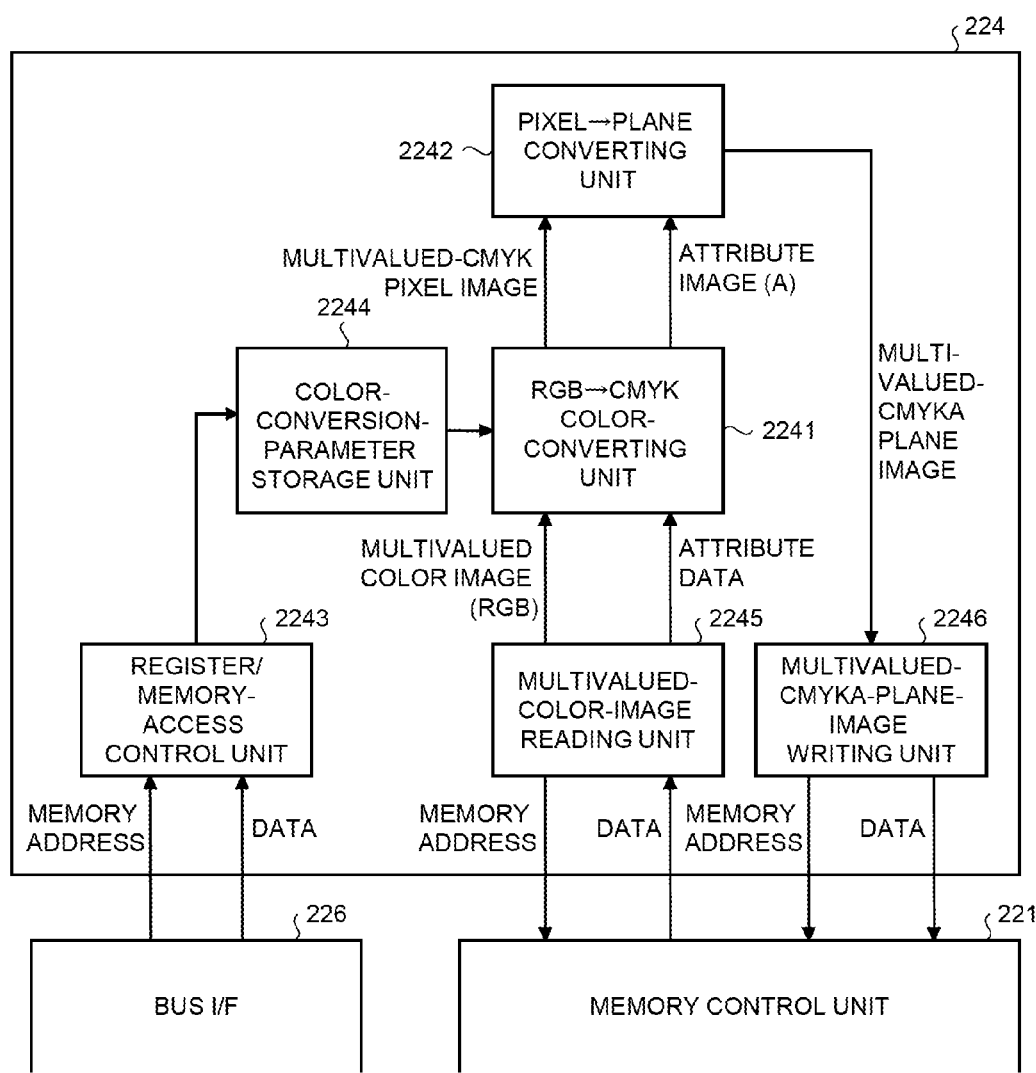
FIG. 14 is a block diagram illustrating a specific configuration example of a color-conversion processing unit according to the embodiment.

Next, a specific configuration example of the color-conversion processing unit 224 illustrated in FIG. 9 and FIG. 13 is explained in detail with reference to the accompanying drawings. FIG. 14 is a block diagram illustrating a specific configuration example of the color-conversion processing unit according to the embodiment. As illustrated in FIG. 14, the color-conversion processing unit 224 includes a register/memory-access control unit 2243, a color-conversion-parameter storage unit 2244, a multivalued-color-image reading unit 2245, the RGB→CMYK color-converting unit 2241, the pixel→plane converting unit 2242, and a multivalued-CMYKA-plane-image writing unit 2246.

The register/memory-access control unit 2243 is a control unit for the CPU 201 to access memories and registers included in various components, and is connected to the bus I/F 226. The color-conversion-parameter storage unit 2244 stores dot data that is necessary for the RGB→CMYK color-converting unit 2241, and the like. The multivalued-color-image reading unit 2245 reads a color image of ARGB from the multivalued-color-image storage unit 244 of the image memory thorough the memory control unit 221, and transfers it to the RGB→CMYK color-converting unit 2241. The RGB→CMYK color-converting unit 2241 performs color conversion processing of RGB→CMYK, and BG (black generation)/UCR (under color removal) processing on an ARGB value input from the multivalued-color-image reading unit 2245. Moreover, the RGB→CMYK color-converting unit 2241 transfers a multivalued-CMYK pixel image thus generated and an attribute image (A) to the pixel→plane converting unit 2242. The pixel→plane converting unit 2242 groups the multivalued-CMYK pixel image and the attribute image (A) received from the RGB-→CMYK color-converting unit 2241 in a memory word unit per plane, and performs pixel→plane conversion processing per memory word. Furthermore, the pixel→plane converting unit 2242 transfers a multivalued-CMYK plane image acquired by conversion to the multivalued-CMYKA-plane-image writing unit 2246. The multivalued-CMYKA-plane-image writing unit 2246 transfers the converted multivalued-CMYK plane image that is input from the pixel→plane converting unit 2242 to the multivalued-CMYKA-plane-image storage unit 243 of the image memory 240 through the memory control unit 221.

Figure 15:
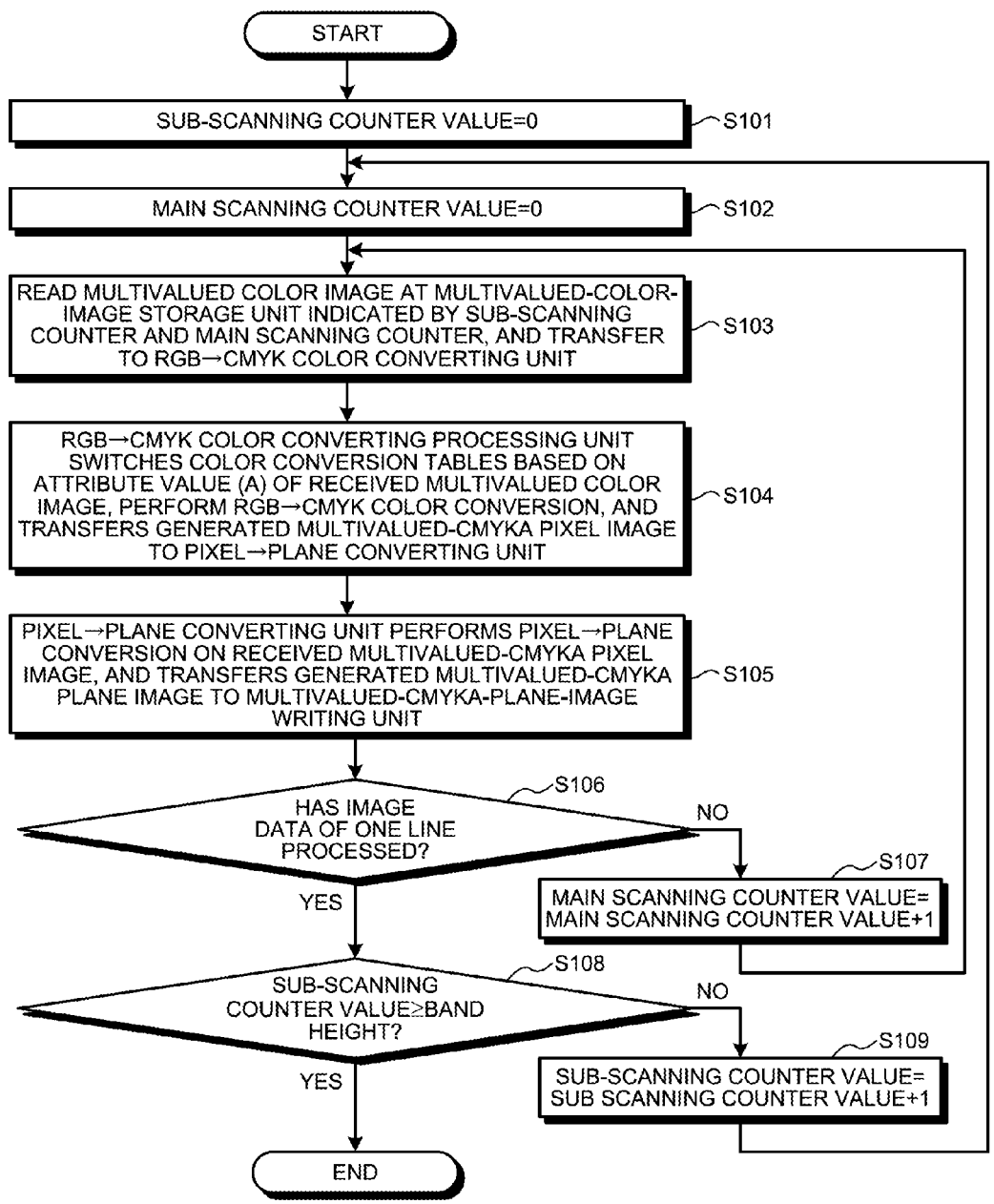
FIG. 15 is a flowchart illustrating an overview of an operation of a color-conversion processing unit according to the embodiment.

Next, an operation example of the color-conversion processing unit 224 illustrated in FIG. 14 is explained. FIG. 15 is a flowchart illustrating an overview of an operation of the color-conversion processing unit according to the embodiment. As illustrated in FIG. 15, in this operation, first, a value of a counter (sub-scanning counter) of the number of lines in the sub-scanning direction of a color image that is stored in the multivalued-color-image storage unit 244 is initialized (sub-scanning counter value=0) (step S101). Subsequently, a value of a counter (main scanning counter) of the number of pixels in the main scanning direction of a color image that is stored in the multivalued-color-image storage unit 244 is initialized (main scanning counter value=0) (step S102).

Subsequently, the multivalued-color-image reading unit 2245 reads a multivalued color value (ARGB) that is specified by the sub-scanning counter (also referred to as band line counter) and the main scanning counter and that is stored in the multivalued-color-image storage unit 244, and transfers the read multivalued color value (ARGB) to the RGB→CMYK color-converting unit 2241 (step S103).

Subsequently, the RGB→CMYK color-converting unit 2241 performs color conversion of RGB→CMYK on the multivalued color value (ARGB) that is input from the multivalued-color-image reading unit 2245, and transfers a multivalued-CMYK pixel image generated by the color conversion and attribute image (A) to the pixel→plane converting unit 2242 (step S104).

Subsequently, the pixel→plane converting unit 2242 performs pixel→plane conversion on the multivalued-CMYK pixel image converted into CMYK, and transfers a multivalued-CMYK plane image acquired by this conversion to the multivalued-CMYKA-plane-image writing unit 2246 (step S105).

Subsequently, it is determined whether processing for image data corresponding to one line has been completed (step S106), and when it has been completed (step S106: YES), it proceeds to step S108. On the other hand, when it has not been completed (step S106: NO), the main scanning counter value is incremented by 1 (step S107), and it returns to step S103 to perform the operation thereafter.

At step S108, it is determined whether the value of the sub-scanning counter has reached a band height. When the sub-scanning counter value has not reached the band height (step S108: NO), the sub-scanning counter value is incremented by 1 (step S109), and it returns to step S102 to perform the operation thereafter. On the other hand, when the sub-scanning counter value has reached the band height (step S108: YES), the operation is ended.

Figure 16:
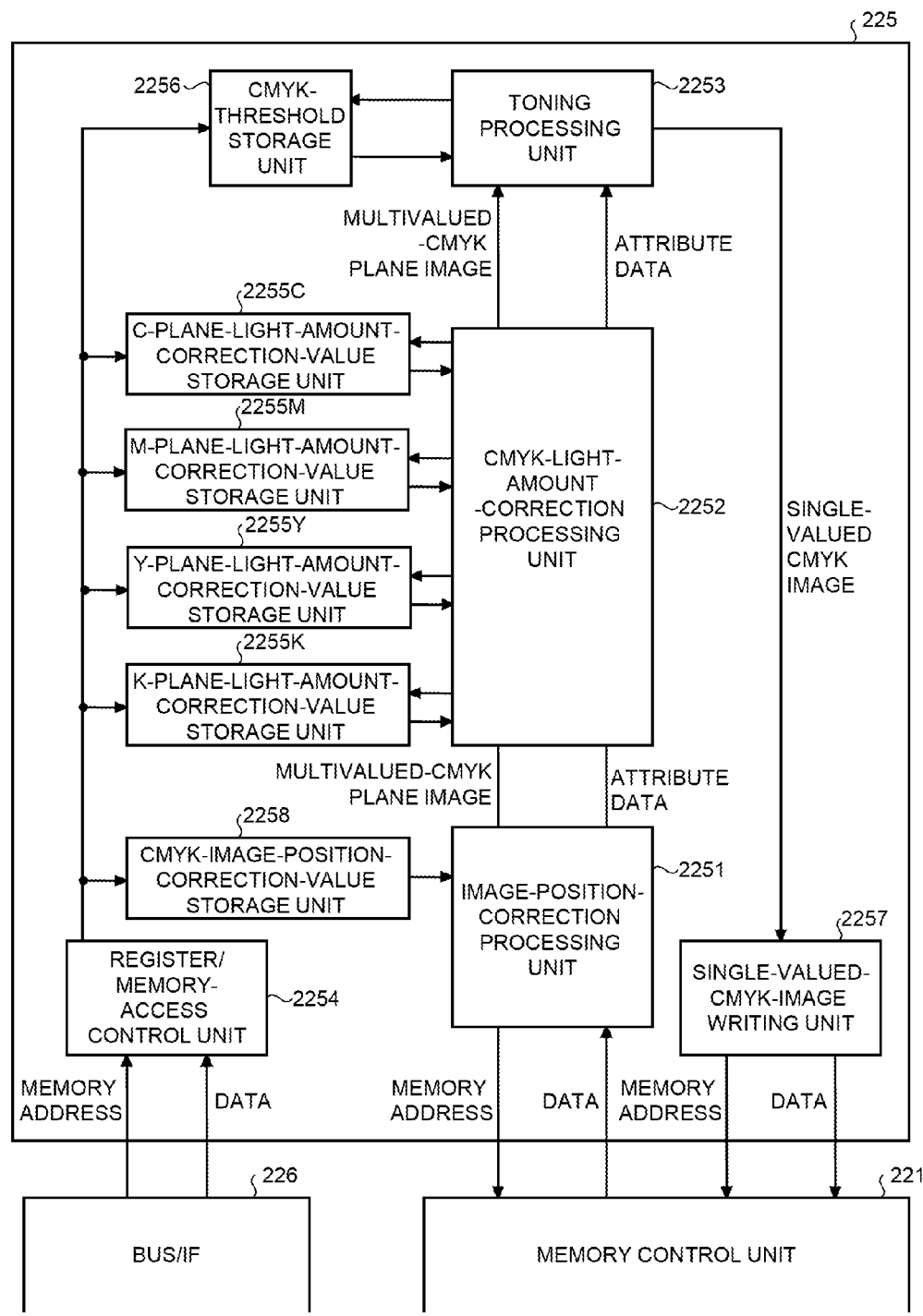
FIG. 16 is a block diagram illustrating a specific configuration example of an engine-characteristic image processing unit according to the embodiment.

Next, a specific configuration example of the engine-characteristic image-processing unit 225 illustrated in FIG. 9 and FIG. 13 is explained with reference to the drawings. FIG. 16 is a block diagram illustrating a specific configuration example of the engine-characteristic image-processing unit 225 according to the embodiment. As illustrated in FIG. 16, the engine-characteristic image-processing unit 225 includes a register/memory-access control unit 2254, the image-position-correction processing unit 2251, light-amount-correction-value storage units 2255C, 2255M, 2255Y, and 2255K of the respective planes of CMYK, the CMYK light-amount-correction processing unit 2252, the CMYK-threshold storage unit 2256, the toning processing unit 2253, a single-valued-CMYK-image writing unit 2257, and the CMYK image-position-correction-value storage unit 2258.

The register/memory-access control unit 2254 is a control unit for the CPU 201 to access memories and registers included in various components, and is connected to the bus I/F 226. The light-amount-correction-value storage units 2255C, 2255M, 2255Y, and 2255K of the respective planes of CMYK store light-amount correction values necessary for the CMYK light-amount-correction processing unit 2252. The CMYK-threshold storage unit 2256 stores a threshold matrix that is necessary for the toning processing unit 2253, and the like. The image-position-correction processing unit 2251 receives a multivalued-CMYKA plane image from the multivalued-CMYKA-plane-image storage unit 243, and performs image-position correction processing including minute rotation processing and position moving processing of an offset (X, Y), on the received multi-valued CMYKA plane image based on a rotation angle of the respective CMYK planes input from the CMYK image-position-correction-value storage unit 2258, and the offset (X, Y). Moreover, the image-position-correction processing unit 2251 transfers the multivalued-CMYKA plane image subjected to the image-position correction processing to the CMYK light-amount-correction processing unit 2252. The CMYK light-amount-correction processing unit 2252 receives a multivalued-CMYK plane image in the multivalued-CMYKA plane image subjected to the image-position correction processing from the image-position-correction processing unit 2251, and performs CMYK light-amount-correction processing based on a light-amount correction value input from the light-amount-correction-value storage units 2255C to 2255K of the respective planes of CMYK. Furthermore, the CMYK light-amount-correction processing unit 2252 transfers the multivalued-CMYK plane image subjected to the CMYK light-amount correction to the toning processing unit 2253. The toning processing unit 2253 reads thresholds of the respective planes of CMYK from the CMYK-threshold storage unit 2256, and performs toning processing using the thresholds of the respective planes of CMYK on the multivalued-CMYK plane image subjected to the CMYK light-amount correction. Moreover, the toning processing unit 2253 transfers a single-valued CMYK image that is acquired by the toning processing to the single-valued-CMYK-image writing unit 2257. The single-valued-CMYK-image writing unit 2257 transfers the single-valued CMYK image subjected to the toning processing to the single-valued-CMYK-image storage unit 242 of the image memory 240 through the memory control unit 221.

Figure 17:
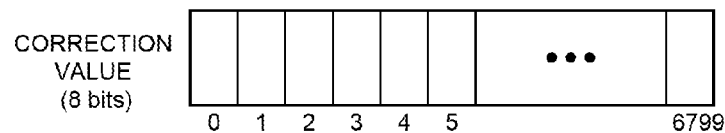
FIG. 17 illustrates a format of light-amount correction values of the respective planes of CMYK that are stored in a light-amount-correction-value storage unit according to the embodiment.

FIG. 17 illustrates a format of a light-amount correction value that is stored in the light-amount-correction-value storage units 2255C, 2255M, 2255Y, and 2255K of the respective planes of CMYK. As illustrated in FIG. 17, in the light-amount-correction-value storage units 2255C, 2255M, 2255Y, and 2255K of the respective planes of CMYK, a light-amount correction value to correct light amount variations are stored per pixel in the main scanning direction, that is, per each of the all LED devices 1216 on the LED array chip 1211. The light-amount correction value is a value that is specified by measuring a light amount of an emitting light of each of the LED devices 1216 for the same current value, for example, at the time of manufacturing. This light-amount correction value can be, for example, the same as the light-amount correction data that is stored in the ROM 9217 explained using FIG. 6.

Figure 18:
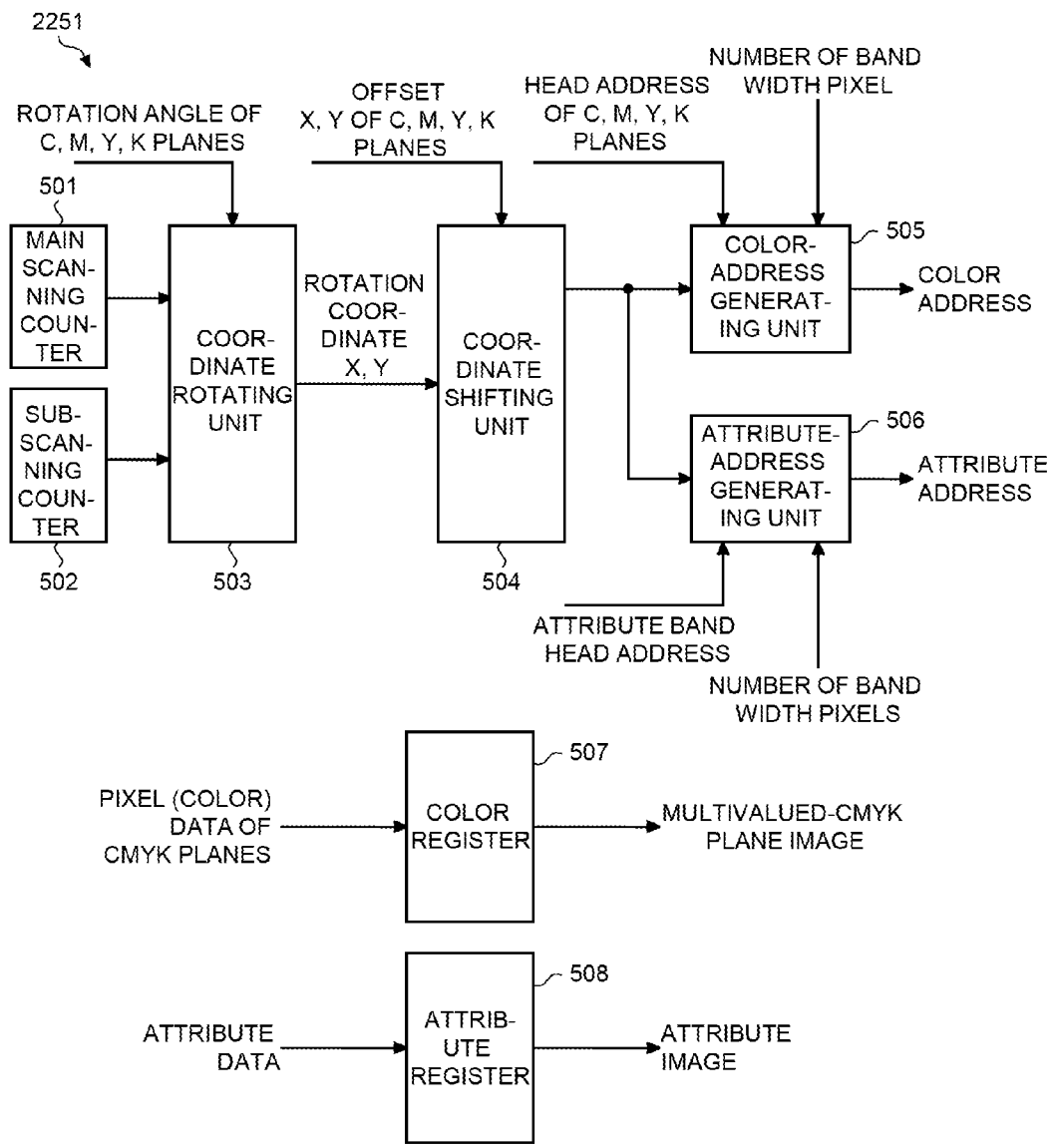
FIG. 18 illustrates a specific configuration example of an image-position-correction processing unit illustrated in FIG. 16.

Furthermore, FIG. 18 illustrates a specific configuration example of the image-position-correction processing unit illustrated in FIG. 16. As illustrated in FIG. 18, the image-position-correction processing unit 2251 includes a main scanning counter 501. A sub-scanning counter 502, a coordinate rotating unit 503, a coordinate shifting unit 504, a color-address generating unit 505, and an attribute-address generating unit 506. Moreover, the image-position-correction processing unit 2251 further includes a color register 507 and an attribute register 508.

The main scanning counter 501 generates the number of pixels in the main scanning direction of a corresponding plane in the multivalued-CMYKA plane image stored in the multivalued-CMYKA-plane-image storage unit 243. The sub-scanning counter 502 generates the number of lines in the sub-scanning direction of a corresponding plane in the multivalued-CMYKA plane image stored in the multivalued-CMYKA-plane-image storage unit 243. The coordinate rotating unit 503 receives a main scanning counter value from the main scanning counter 501, a sub-scanning counter value from the sub-scanning counter 502, and a rotation angle that differs per each plane of CMYK input thereto. Moreover, the coordinate rotating unit 503 calculates Equations (1) and (2) below using the received main scanning counter value as a value of X, and the sub-scanning counter value as a value of Y, and acquires the value X and the value Y after rotation, to transfer to the acquired value X and the value Y to the coordinate shifting unit 504.

$$\text{value X after rotation} = X \times \cos(\text{rotation angle}) - Y \times \sin(\text{rotation angle}) \quad (1)$$

$$\text{value Y after rotation} = X \times \sin(\text{rotation angle}) + Y \times \cos(\text{rotation angle}) \quad (2)$$

The coordinate shifting unit 504 adds offset values tx and ty to be shifted to the value X and the value Y after rotation received from the coordinate rotating unit 503, by using Equations (3) and (4) below, thereby acquiring the value X and the value Y after correction. Furthermore, the coordinate shifting unit 504 transfers the value X and the value Y after correction to the color-address generating unit 505 and the attribute-address generating unit 506, respectively.

$$\text{value X after correction} = \text{value X after rotation} + \text{offset tx} \quad (3)$$

$$\text{value Y after correction} = \text{value Y after rotation} + \text{offset ty} \quad (4)$$

The color-address generating unit 505 generates an address of a multivalued-CMYKA plane image that is stored in the multivalued-CMYKA-plane-image storage unit 243 in a memory, by using the value X and value Y after correction that are received from the coordinate shifting unit 504. Furthermore, the color-address generating unit 505 transfers the generated address to the multivalued-CMYKA-plane-image storage unit 243. The attribute-address generating unit 506 generates an address of an attribute image (A) that is stored in the multivalued-CMYKA-plane-image storage unit 243 in a memory, by using the value X and value Y after correction that are received from the coordinate shifting unit 504. Moreover, the attribute-address generating unit 506 transfers the generated address to the multivalued-CMYKA-plane-image storage unit 243.

The color register 507 stores color data that is read from the multivalued-CMYKA-plane-image storage unit 243 based on the address in the memory of the multivalued-CMYK plane image that is generated by the color-address generating unit 505 and stored in the multivalued-CMYKA-plane-image storage unit 243. Furthermore, the color register 507 transfers the multivalued-CMYK plane image thus stored, to the CMYK light-amount-correction processing unit 2252. The attribute register 508 stores attribute data that is read from the multivalued-CMYKA-plane-image storage unit 243 based on the address in a memory of the attribute image (A) that is generated by the attribute-address generating unit 506 and stored in the multivalued-CMYKA-plane-image storage unit 243. Moreover, the attribute register 508 transfers the attribute image (A) thus stored, to the CMYK light-amount-correction processing unit 2252.

Figure 19:
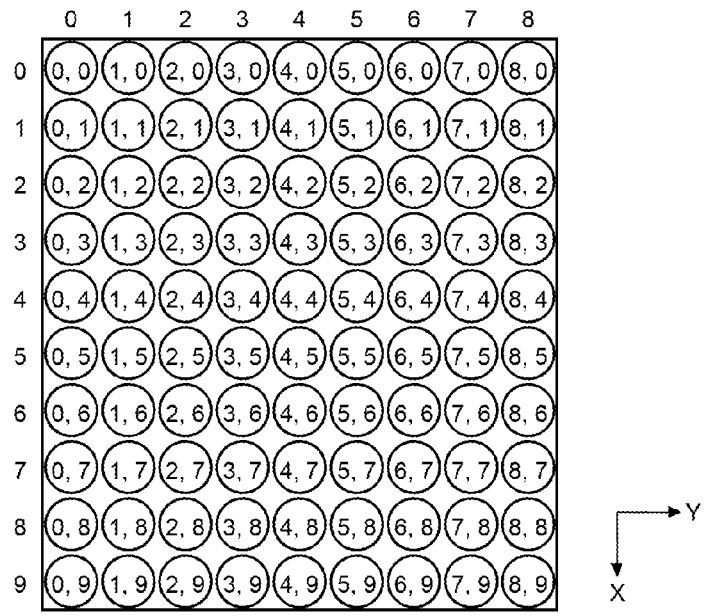
FIG. 19 illustrates a pixel arrangement of image data before image position correction (rotation) by an operation of the image-position-correction processing unit according to the embodiment.
Figure 20:
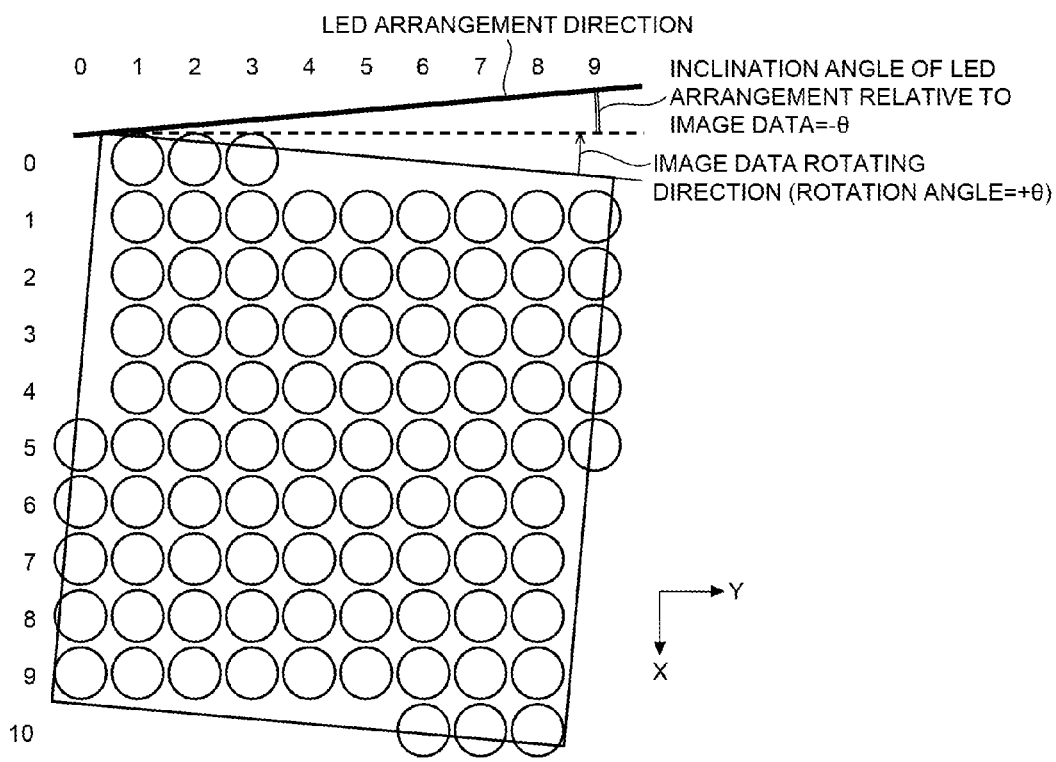
FIG. 20 illustrates a relationship between a pixel arrangement of image data before image position correction (rotation) by the operation of the image-position-correction processing unit according to the embodiment and an inclination of an LED array chip.
Figure 21:
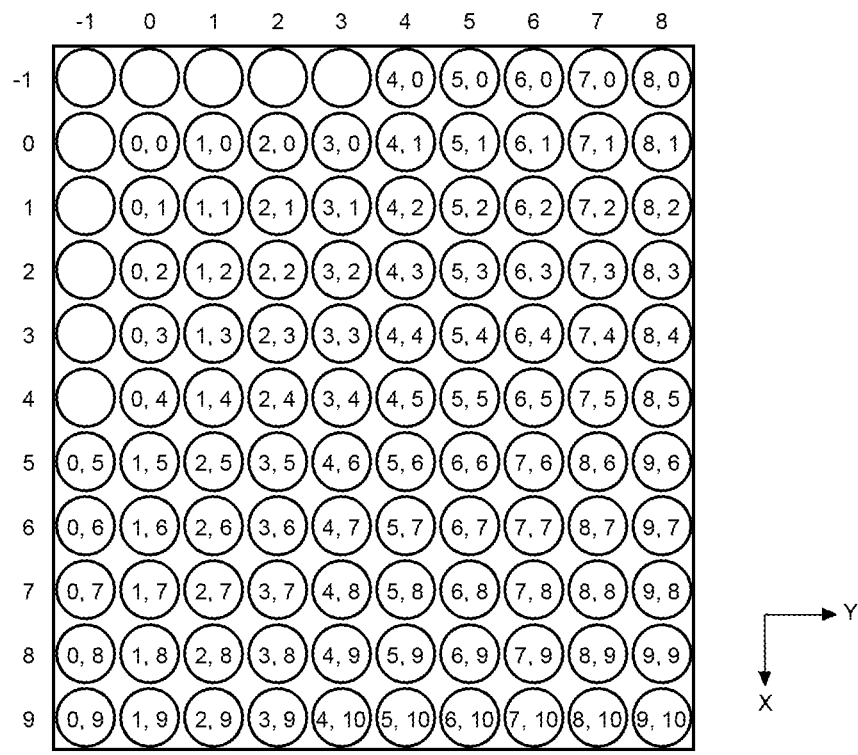
FIG. 21 illustrates a pixel arrangement of image data after image position correction (rotation) by an operation of the image-position-correction processing unit according to the embodiment.

An operation of the image-position-correction processing unit 2251 according to the embodiment is explained herein with an example. FIG. 19 to FIG. 21 are diagrams for explaining the operation of the image-position-correction processing unit according to the embodiment. FIG. 19 illustrates a pixel arrangement of image data before image position correction (rotation), FIG. 20 illustrates a relationship between a pixel arrangement of image data before image position correction (rotation) and an inclination of an LED array chip, and FIG. 21 illustrates a pixel arrangement of image data after image position correction (rotation). In examples illustrated in FIG. 19 to FIG. 21, correction for an offset is omitted for simplicity of explanation.

As illustrated in FIG. 19, in the pixel arrangement of image data before image position correction (rotation), the value X of pixels arranged in an X-axis direction and the value Y of pixels arranged in a Y-axis direction are the same. On the other hand, as illustrated in FIG. 20, when an arrangement direction of the LED devices 1216 on the LED array chip 1211 is inclined relative to image data by an angle $-\theta$, the coordinate rotating unit 503 of the image-position-correction processing unit 2251 rotates the image data by an angle $+\theta$. That is, the coordinate rotating unit 503 performs rotation calculation to rotate image data in a direction opposite to an inclined direction of the LED array chip 1211. Thus, as illustrated in FIG. 21, inclined image data after rotation is generated.

In the example illustrated in FIG. 21, for example, a pixel at coordinates (X=5, Y=0) after rotation corresponds to a pixel at coordinates (X=5, Y=1) before rotation. Therefore, in the image data after rotation, a pixel value that is read from the coordinates (X=5, Y=1) before rotation is written at the (X=5, Y=0). In the operation at that time, the coordinate rotating unit 503 generates, when values of the main scanning counter value=5 and the sub-scanning counter value=0 are input, the value X after rotation=5 and the value Y after rotation=1 based on a rotation angle input separately, and writes a pixel value that is read from the pixel at the coordinates before rotation into a pixel of the acquired coordinates. The coordinate rotating unit 503 performs such a processing in the main scanning direction from X=0 to cover the main scanning width, and further performs in the sub-scanning direction from Y=0 to cover the sub-scanning width, thereby generating image data after rotation as illustrated in FIG. 21.

Figure 22:
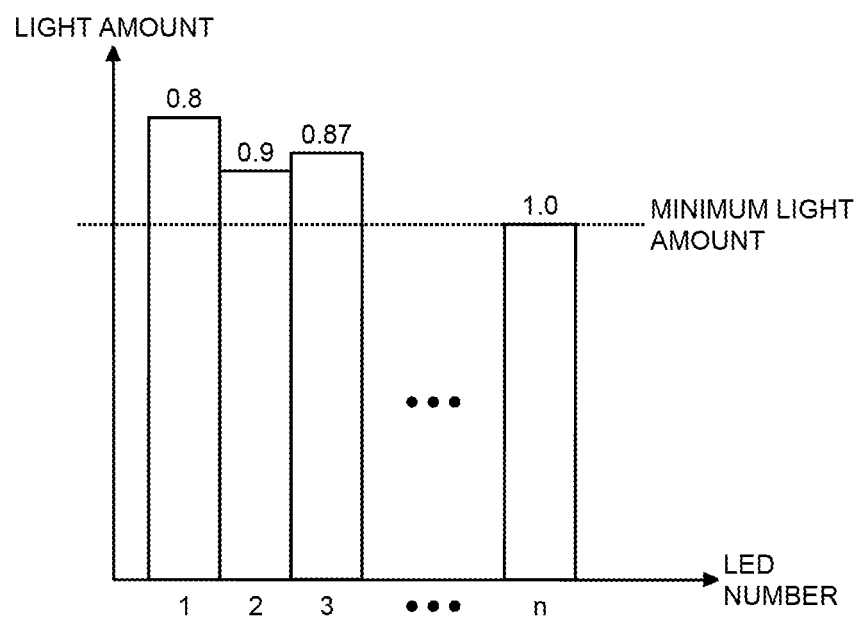
FIG. 22 illustrates an example of a light-amount correction value per LED device arranged in the LED array chip according to the embodiment.

Subsequently, the CMYK light-amount-correction processing unit 2252 according to the embodiment is explained. FIG. 22 illustrates an example of a light-amount correction value per LED device arranged in the LED array chip according to the embodiment. In the example illustrated in FIG. 22, among n pieces of LED devices with LED numbers "LED1" to "LEDn", the LED device of "LEDn" has the smallest light amount. In this case, the light amount of the LED device of "LEDn" is regarded as a minimum light amount, and a reduction rate to make a light amount of another LED device equal to the minimum light amount is set as a light-amount correction value of each LED device. For example, in the example illustrated in FIG. 22, the light-amount correction value of the LED device "LED1" is 0.8, the light-amount correction value of the LED device "LED2" is 0.9, and the light-amount correction value of the LED device "LED3" is 0.87. Moreover, the light-amount correction value of the LED device "LEDn" is 1.0. In the light-amount-correction-value storage units 2255C to 2255K of the respective planes of CMYK illustrated in FIG. 16, the light-amount correction values respectively corresponding to the LED device 1216 of the LED array chip 1211 provided for each of the CMYK planes are stored as the light-amount correction data.

Figure 23:
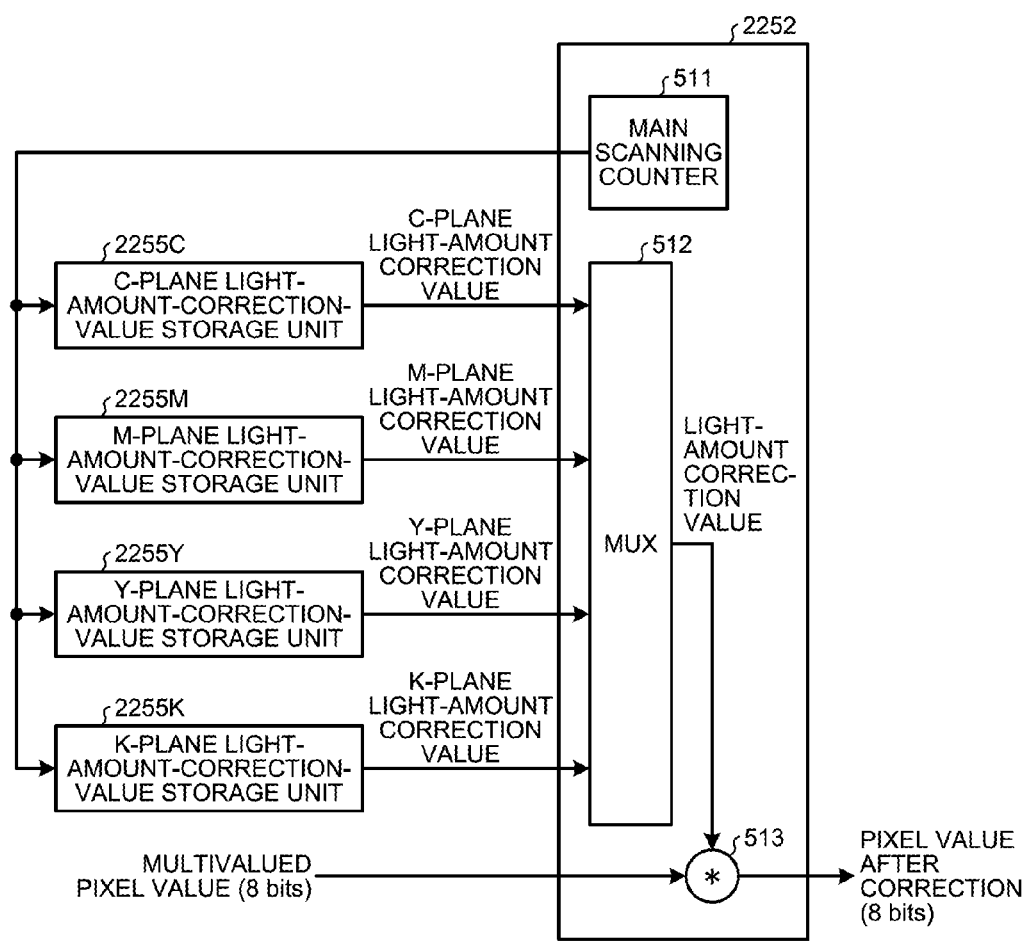
FIG. 23 is a block diagram illustrating a schematic configuration example of a CMYK-light-amount-correction processing unit illustrated in FIG. 16.

Furthermore, FIG. 23 is a block diagram illustrating a schematic configuration example of the CMYK-light-amount-correction processing unit illustrated in FIG. 16. As illustrated in FIG. 23, the CMYK light-amount-correction processing unit 2252 includes a main scanning counter 511, a multiplexer (MUX) 512, and a multiplier 513.

The main scanning counter 511 generates X coordinates in the main scanning direction in which image processing is being performed, and inputs the generated X coordinates into the light-amount-correction-value storage units 2255C to 2255K of the respective planes of CMYK. The light-amount-correction-value storage units 2255C to 2255K of the respective planes of CMYK inputs a light-amount correction value of the LED number corresponding to the input X coordinate to the multiplexer 512.

The multiplexer 512 selects a light-mount correction value of either plane from among light-amount correction values input from the light-amount-correction-value storage units 2255C to 2255K of the respective planes of CMYK, and inputs the selected light-amount correction value to the multiplier 513.

The multiplier 513 performs light amount correction of a pixel value of the respective planes of CMYK generated by the RGB→CMYK color-converting unit 2241 in FIG. 14. To the multiplier 513, pixel values of pixels of the respective planes in a multivalued-CMYK plane image are also input sequentially. The multiplier 513 multiplies the input pixel value by the light-amount correction value input from the multiplexer 512, thereby generating a pixel value after correction. For example, in the example illustrated in FIG. 22, the pixel value of the pixel corresponding to the LED device of "LED1" is multiplied by 0.8, and the pixel corresponding to the LED device of "LED2" is multiplied by 0.9, the pixel value of the pixel corresponding to the LED device of "LED3" is multiplied by 0.87, and the pixel value of the pixel corresponding to the LED device of "LEDn" is multiplied by 1.0. Thus, the light amount of each of the LED devices is adjusted to the minimum light amount of the LED device of "LEDn".

Figure 24:
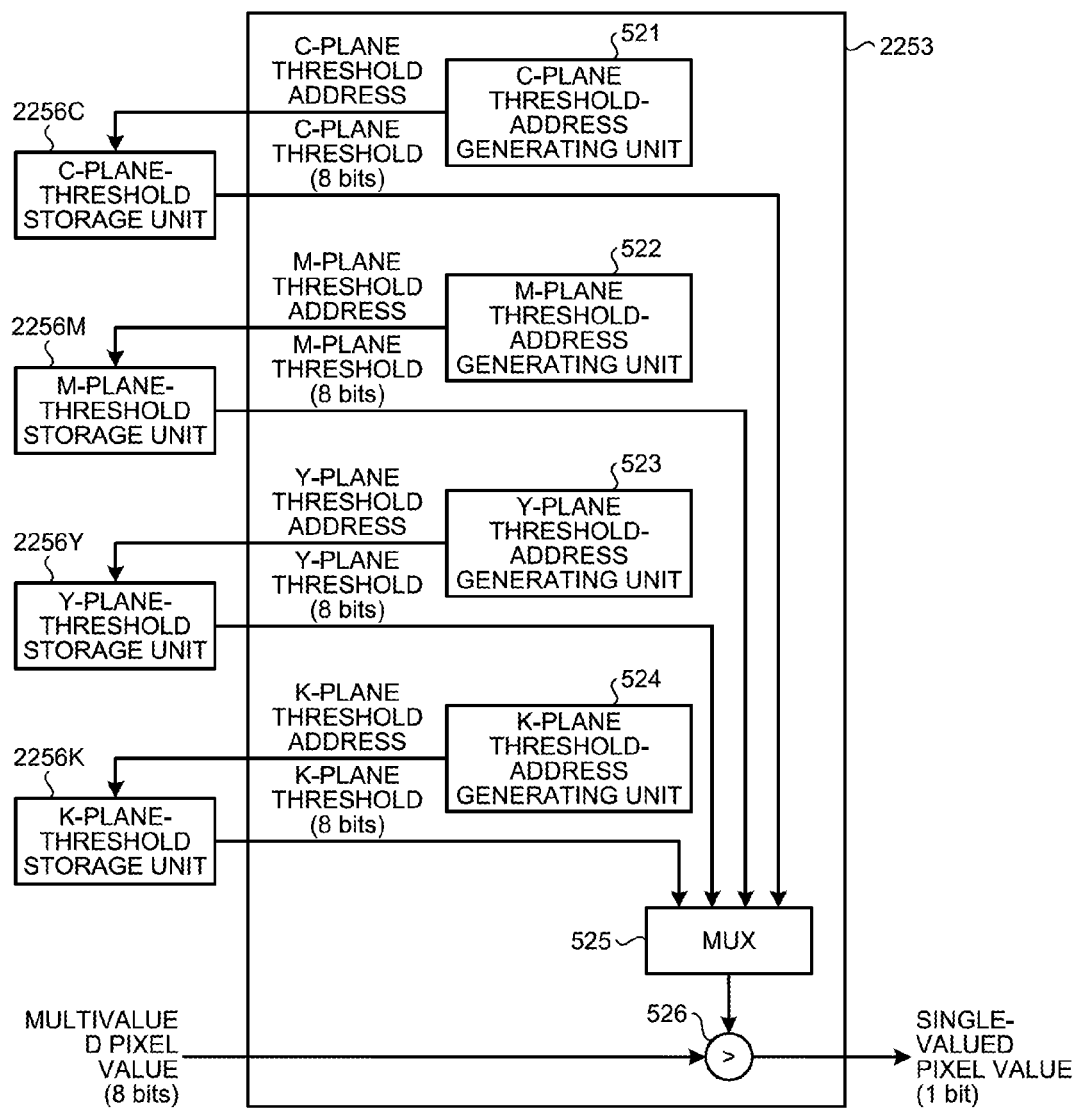
FIG. 24 is a block diagram illustrating a schematic configuration example of a toning processing unit illustrated in FIG. 16.

Next, the toning processing unit 2253 according to the embodiment is explained. FIG. 24 is a block diagram illustrating a schematic configuration example of the toning processing unit illustrated in FIG. 16. As illustrated in FIG. 24, the toning processing unit 2253 includes threshold-address generating units 521 to 524 of the respective planes of CMYK, a multiplexer 525, and a comparator 526. Moreover, threshold storage units 2256C to 2256K of the respective planes of CMYK correspond to the CMYK-threshold storage unit 2256 in FIG. 16, and store dither threshold values of the respective planes of CMYK, respectively.

The threshold-address generating units 521 to 524 of the respective planes of CMYK acquires coordinates of threshold matrixes of the respective planes of CMYK, from a width and a height of the threshold matrixes of the respective planes of CMYK, a value of the sub-scanning counter and a value of the main scanning counter that indicate a position of the multivalued-CMYK plane image being processed. Moreover, the threshold-address generating units 521 to 524 of the respective planes of CMYK generates addresses of the respective planes of CMYK in the threshold storage units 2256C to 2256K from the acquired coordinates, and input thereto, respectively. The threshold storage units 2256C to 2256K of the respective planes of CMYK which receive the addresses input a threshold corresponding to the received address to the multiplexer 525.

The multiplexer 525 selects a threshold of either plane from among the thresholds input from the threshold storage units 2256C to 2256K of the respective planes of CMYK, and inputs the selected threshold to the comparator 526.

The comparator 526 also receives one of multivalued pixel values of either plane in multivalued-CMYK plane image after light amount correction from the CMYK light-amount-correction processing unit 2252, and an attribute value of the pixel, in addition to the threshold from the multiplexer 525. The comparator 526 compares the input threshold and the multivalued pixel value after light amount correction, and when the multivalued pixel value is larger than the threshold, performs toning processing to set a single-valued pixel value of the pixel to 1, and when the multivalued pixel value is equal to or smaller than the threshold, toning processing to set the single-valued pixel value to 0. Thus, a single-valued CMYK pixel after toning processing is generated.

Figure 25:
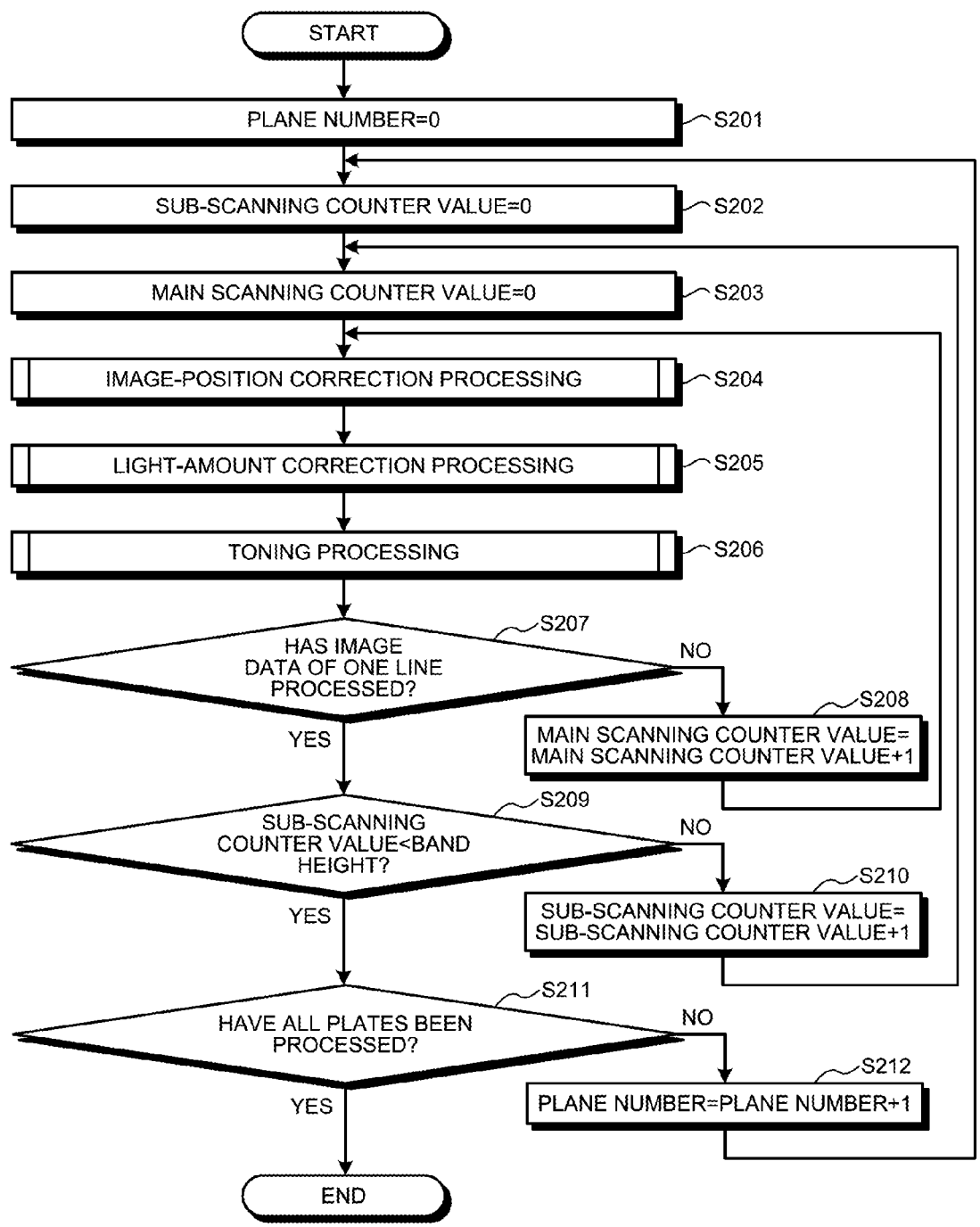
FIG. 25 is a flowchart illustrating an overview of operation of the engine-characteristic-image processing unit according to the embodiment.

Next, an operation example of the engine-characteristic image-processing unit 225 illustrated in FIG. 16 is explained. FIG. 25 is a flowchart illustrating an overview of operation of the engine-characteristic-image processing unit according to the embodiment. As illustrated in FIG. 25, in this operation, first, specification of plane to be a subject of image processing among the respective planes of CMYK is initialized (step S201). In this initialization, a plane number specifying a plane to be a subject of image processing is initialized to 0. The plane number is specified, for example, as the C plane is 0, the M plane is 1, the Y plane is 2, and the K plane is 3.

Subsequently, a counter of the number of lines in the sub-scanning direction for a multivalued-CMYKA plane image stored in the multivalued-CMYKA-plane-image storage unit 243 is initialized (sub-scanning counter value=0) (step S202). Subsequently, a counter of the number of pixels in the main scanning direction for the multivalued-CMYKA plane image stored in the multivalued-CMYKA-plane-image storage unit 243 is initialized (main scanning counter value=0) (step S203).

Subsequently, the image-position-correction processing unit 2251 performs image-position correction processing of multivalued-CMYK plane image that is stored in the multivalued-CMYKA-plane-image storage unit 243, based on the specified plane number, the sub-scanning counter value, the main scanning counter value, the rotation angel of the respective planes of CMYK, and a shifting value of the respective planes of CMYK, and reads multi-valued CMYK plane image thus obtained in a horizontal direction, and transfer to the CMYK light-amount-correction processing unit 2252 (step S204). The image-position correction processing at this time is processing explained using FIG. 18 and FIG. 21 above, and therefore, detailed explanation thereof is omitted herein.

Subsequently, the CMYK light-amount-correction processing unit 2252 performs light-amount correction processing on a CMYK value of each pixel in a multivalued-CMYK plane image subjected to image position correction input from the image-position-correction processing unit 2251, and transfers a multivalued-CMYK plane image thus obtained, to the toning processing unit 2253 (step S205). The light-amount correction processing at this time is the processing explained using FIG. 22 and FIG. 23 above, and therefore, detailed explanation thereof is omitted herein.

Subsequently, the toning processing unit 2253 performs toning processing on a CMYK value of each pixel in the multivalued-CMYK plane image subjected to the light amount correction input from the CMYK light-amount-correction processing unit 2252, and transfers a single-valued CMYK plane image thus obtained, to the single-valued-CMYK-image writing unit 2257 (step S206). The toning processing at this time is the processing explained using FIG. 24 above, and therefore, detailed explanation thereof is omitted herein.

Subsequently, it is determined whether processing for image data corresponding to one line has been completed (step S207), and when it has been completed (step S207: YES), it proceeds to step S209. On the other hand, when it has not been completed (step S207: NO), the main scanning counter value is incremented by 1 (step S208), and it returns to step S204, to perform the operation thereafter.

At step S209, it is determined whether a value of the sub-scanning (band line) counter has reached the band height. When the sub-scanning counter value has not reached the band height (step S209: NO), the sub-scanning counter value is incremented by 1 (step S210), and it returns to step S203 to perform the operation thereafter. On the other hand, when the sub-scanning counter value has reached the band height (step S209: YES), it proceeds to step S211.

At step S211, it is determined whether the processing for all of the CMYK planes has been completed. When the processing has not been completed for all of the planes (step S211: NO), the plane number is incremented by 1 (step S212), and it returns to step S202 to perform the operation thereafter. On the other hand, when the processing for all of the planes have been completed (step S211: YES), the operation is ended.

First Modification

Figure 26:
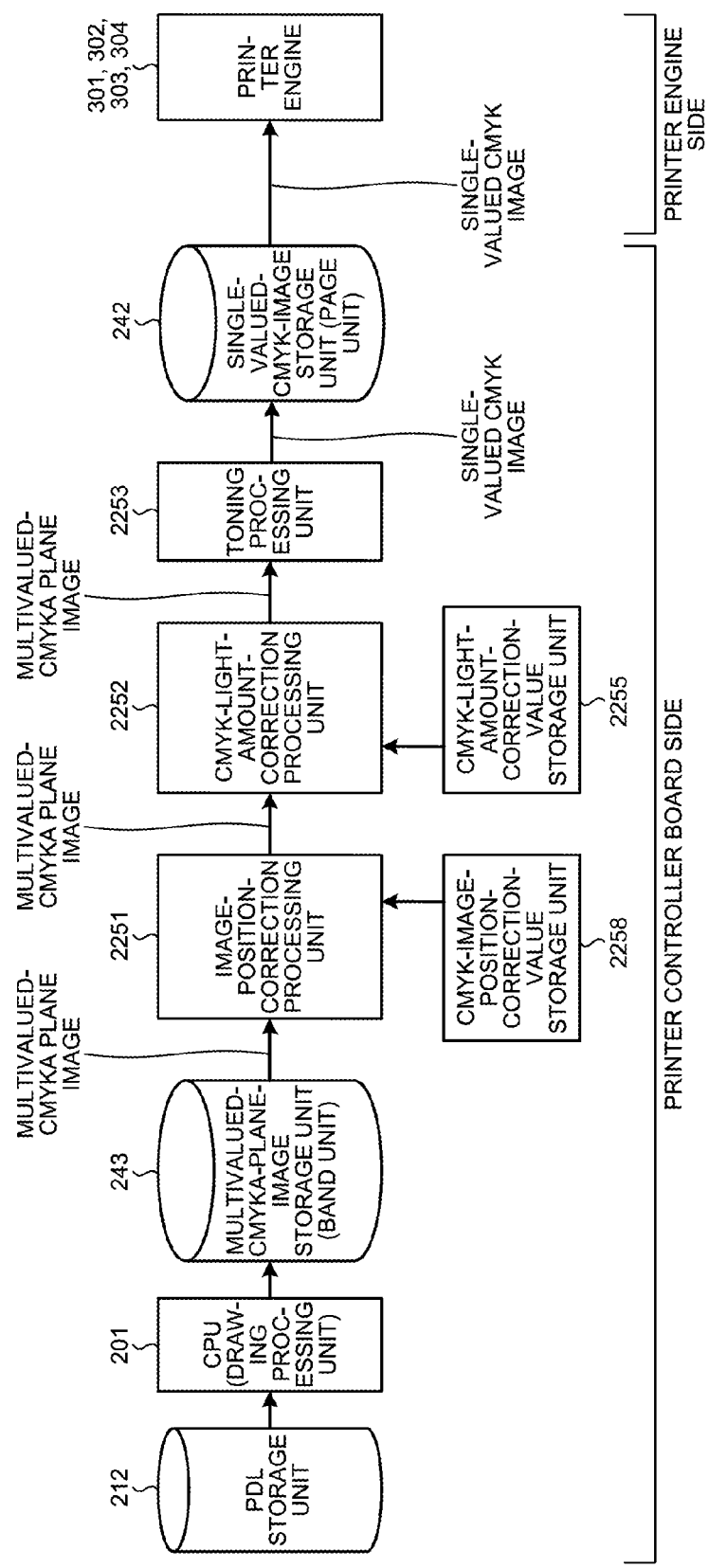
FIG. 26 is a block diagram illustrating a schematic configuration example of a color printer according to a first modification of the embodiment.

Subsequently, a first modification of the embodiment is explained in detail using the drawings. FIG. 26 is a block diagram illustrating a schematic configuration example of a color printer according to the first modification. In FIG. 26, the single-valued encoding unit 223 to the LED control units 251/252/253/254 in FIG. 13 are omitted for simplicity of explanation.

In the operation according to the embodiment explained using FIG. 13 above, by converting an RGB value of an image drawn by the CPU (drawing processing unit) 201, a multivalued-CMYKA plane image is generated. On the other hand, in the first modification illustrated in FIG. 26, the drawing processing unit 201 is configured to draw a multi-valued-CMYKA plane image directly. Therefore, in the first modification, the multivalued-color-image storage unit 244 to the pixel→plane converting unit 2242 in FIG. 13 are omitted, and a multivalued-CMYKA plane image is stored in the multivalued-CMYKA-plane-image storage unit 243 directly from the DMA 222.

The image-position-correction processing unit 2251 performs image-position correction processing (refer to FIG. 18) on the multivalued-CMYKA plane image directly drawn in the multivalued-CMYKA-plane-image storage unit 243. The CMYK light-amount-correction processing unit 2252 performs light-amount correction processing on the multi-valued-CMYKA plane image subjected to the image position correction stored in the multivalued-CMYKA-plane-image storage unit 243.

The toning processing unit 2253 performs toning processing on the multivalued-CMYK plane image subjected to the image position correction and the light amount correction, thereby generating a single-valued CMYK image in a page unit, and stores the generated single-valued CMYK image in the single-valued-CMYK-image storage unit 242 in a page unit.

The single-valued CMYK image stored in the single-valued-CMYK-image storage unit 242 is transferred to the respective printer engines in synchronization with the printer engines 301 to 304 of the respective planes of CMYK after being subjected to the encoding processing and the decoding processing. Thus, image data is sequentially printed in the printer engines 301 to 304 of the respective planes of CMYK. The reason why the single-valued CMYK image is stored in a page unit is because image data is required to be prepared in a page unit to output at the speed of the respective engines when the printing is performed by the respective printer engines 301 to 304.

As described, in the first modification, with the configuration of storing a single-valued CMYK image in a page unit, a capacity of a memory in which image data is temporarily stored can be small. In addition, with the configuration of transferring a single-valued CMYK image subjected to toning processing to the printer engines 301 to 304 of the respective planes of CMYK, a transfer speed at the time of transmitting to the printer engines 301 to 304 is allowed to be low. This enables to use a bus and substrate of an operation speed relatively slow.

As other configurations, operations, and effects are the same as those of the embodiment described above, detailed explanation thereof is omitted herein.

Second Modification

Figure 27:
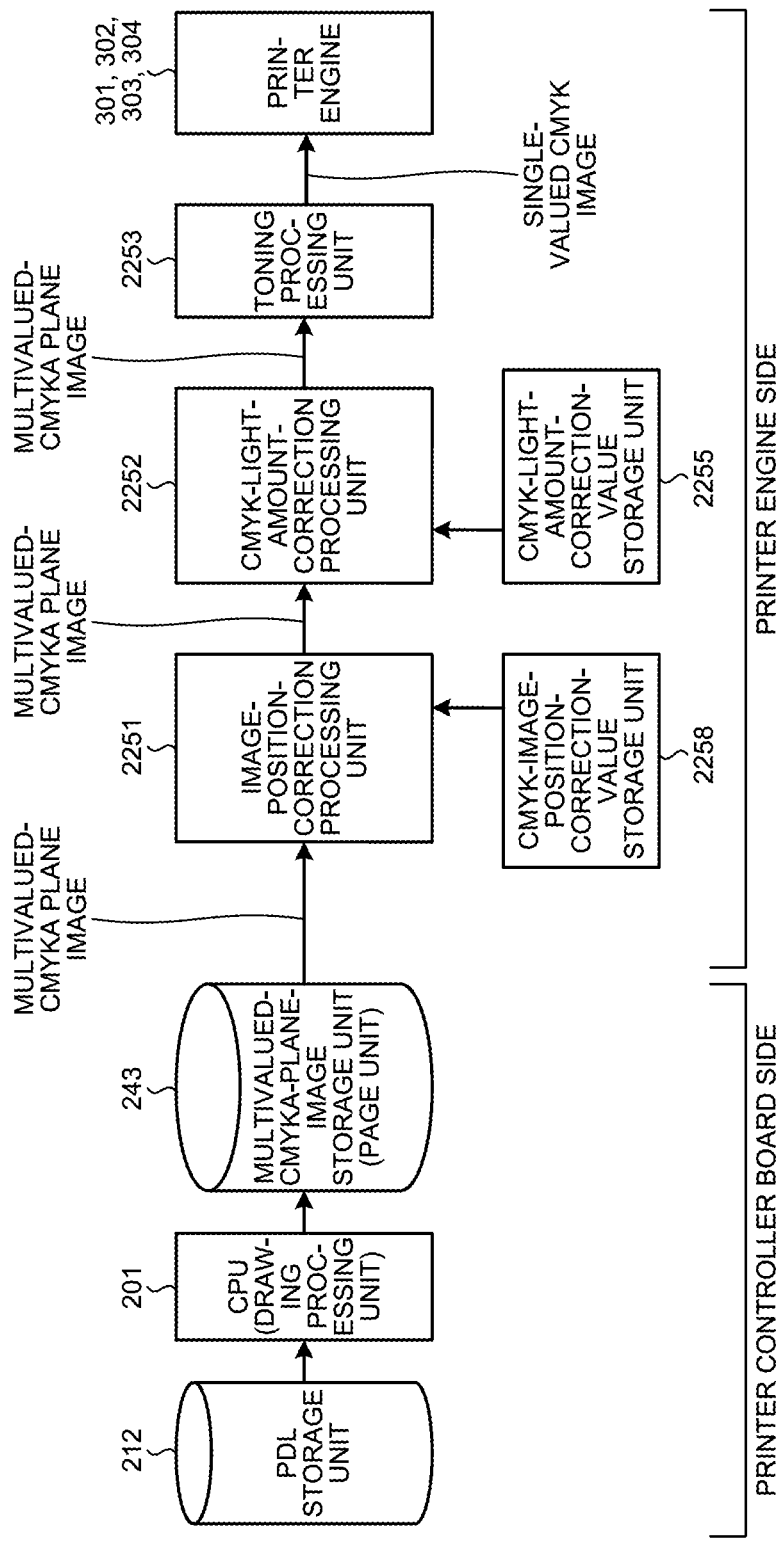
FIG. 27 is a block diagram illustrating a schematic configuration example of a color printer according to a second modification of the embodiment.

Next, a second modification of the embodiment is explained in detail using drawings. FIG. 27 is a block diagram illustrating a schematic configuration example of a color printer according to the second modification of the embodiment. In FIG. 27, similarly to FIG. 26, the single-valued encoding unit 223 to the LED control units 251/252/253/254 in FIG. 13 are omitted for simplicity of explanation.

In the embodiment and the first modification described above, the respective components that perform the image-position correction processing, the light-amount correction processing, and the toning processing are mounted on the side of the printer controller board 190. On the other hand, in the second modification illustrated in FIG. 27, respective components that perform the image-position correction processing, the light-amount correction processing, and the toning processing are mounted on the side of the printer engines 301 to 304 of the respective planes of CMYK. That is, the color-conversion processing unit 224 and the engine-characteristic image-processing unit 225 illustrated in FIG. 9 are mounted on the side of the printer engines 301 to 304 of the respective planes of CMYK. Moreover, the single-valued encoding unit 223 and the single-valued decoding units 231 to 234 of the respective planes of CMYK can be amounted on the side of the printer engines 301 to 304 of the respective planes of CMYK, or on the side of the printer controller board 190 in place of the multi-value coding unit and the multi-value decoding units of the respective planes of CMYK.

In the configuration illustrated FIG. 27, the drawing processing unit 201 generates multivalued-CMYKA plane images in a page unit, and accumulates the images in the multivalued-CMYKA-plane-image storage unit 243. The multivalued-CMYKA plane images accumulated in the multivalued-CMYKA-plane-image storage unit 243 are transferred to the engine-characteristic image-processing unit 225 on the side of the printer engines 301 to 304 in synchronization with the printer engines 301 to 304 of the respective planes of CMYK, and thereafter, subjected to the image-position correction processing, the light-amount correction processing, and the toning processing, to be transferred to the respective printer engines 301 to 304. Thus, image data is sequentially printed by the printer engines 301 to 304 of the respective planes of CMYK.

As other configurations, operations, and effects are the same as those of the embodiment and the first modification described above, detailed explanation thereof is omitted herein.

As explained above, according to the embodiment and the modifications, variations in light amount of the LED devices of the respective planes of CMYK are corrected by image processing. Therefore, a current correction circuit, such as a DAC, is not required to be provided independently to each of the LED devices. Accordingly, it becomes unnecessary to design/mount a large-scale integrated circuit, and thereby becomes possible to reduce the device cost. Moreover, even in a case of mounting a circuit for an electric current, the precision thereof can be reduced, and therefore, increase of the device cost can be suppressed.

According to the present invention, a control system, an image forming system, a control method, and a control program that enable high quality image forming while suppressing the increase in device cost can be achieved.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A control system for controlling an image forming device, the image forming device including a charging device, an image bearer to be charged by the charging device, a light-emitting device array including a plurality of light emitting devices, and a driver configured to cause the light emitting devices to emit light to form a latent image on the image bearer, the control system comprising:
a memory configured to store light-amount correction values for each of the light emitting devices; and
a controller configured to,
store, at a first time, the light-amount correction values for each of the light emitting devices in the memory by,
determining a pixel value of each pixel of a plurality of pixels in image data, the pixel value being a level of intensity of the pixel;
determining the level of intensity of the pixel with a lowest level of intensity among the plurality of pixels;
determining, for each of the plurality of pixels, differences between the level of intensity of a respective one of the plurality of pixels, and the level of intensity of the pixel with the lowest level of intensity; and
storing the differences as the light-amount correction values such that each of the differences is associated with the respective one of the pixels,
receive, at a second time, a request to print the image data, the second time being after the first time, and
print, at the second time, the image data by,
reading the light-amount correction values from the memory,
correcting a pixel value of each of the plurality of pixels in the image data by, for each of the plurality of pixels, reducing the pixel value associated with the respective one of the pixels by a reduction rate equal to one of the light amount correction values associated with the respective one of the pixels, and
controlling the driver to cause each of the light emitting devices to emit light based on image data for which a pixel value of each pixel has been corrected such that the level of intensity of each of the light emitting devices is equal to the lowest level of intensity among the light emitting devices.

2. The control system according to claim 1, wherein
the memory is further configured to store the image data for which the pixel value of each pixel has been corrected, and
the controller is configured to control the driver so as to cause each of the light emitting devices to emit light based on the image data.

3. The control system according to claim 1, wherein
the light-amount correction values are reduction rates to adjust a light emitting amount of light emitting devices to a light emitting amount of a light emitting device having a smallest light emitting amount for an identical current value, among the light emitting devices.

4. The control system according to claim 1, wherein the controller is further configured to,
perform toning processing on the image data for which the pixel value of each pixel has been corrected, and
control the driver so as to cause each of the light emitting devices based on image data that has been subjected to the toning processing.

5. The control system according to claim 4, further comprising:
an encoder configured to encode the image data subjected to the toning processing; and a decoder configured to decode the encoded image data, wherein the controller controls the driver so as to cause each of the light emitting
devices to emit the light based on the image data that has been decoded by the decoder.

6. The control system according to claim 1, wherein
the image forming device includes image forming devices for a C plane, an M plane, a Y plane, and a K plane, respectively,
the image data includes pieces of image data for the C plane, the M plane, the Y plane, and the K plane, respectively,
the memory is configured to store a light-amount correction value for each of the light emitting devices of the light-emitting device array in the image forming device of each of the C plane, the M plane, the Y plane, and the K plane, and
the controller,
corrects a pixel value of each pixel in the piece of image data for each of the C plane, the M plane, the Y plane, and the K plane, based on the light-amount correction value of each of the light emitting devices of each of the C plane, the M plane, the Y plane, and the K plane stored in the memory, and
controls the driver of each of the C plane, the M plane, the Y plane, and the K plane to cause each of the light emitting devices in the light-emitting device array of each of the C plane, the M plane, the Y plane, and the K plane to emit light based on the piece of image data of each of the C plane, the M plane, the Y plane, and the K plane for which a pixel value of each pixel has been corrected.

7. The control system according to claim 6, wherein the controller is further configured to generate the pieces of image data of the C plane, the M plane, the Y plane, and the K plane from RGB image data.

8. An image forming system comprising:
the control system according to claim 1;
the charging device;
the image bearer;
the light-emitting device array; and
the driver.

9. A control method for controlling an image forming device, the image forming device including a charging device, an image bearer to be charged by the charging device, a light-emitting device array including a plurality of light emitting devices, and a driver configured to cause the light emitting devices to emit light to form a latent image on the image bearer, the control method comprising:
storing, at a first time, light-amount correction values for each of light emitting devices in a memory by,
determining a pixel value of each pixel of a plurality of pixels in image data, the pixel value being a level of intensity of the pixel,
determining the level of intensity of the pixel with a lowest level of intensity among the plurality of pixels,
determining, for each of the plurality of pixels, differences between the level of intensity of a respective one of the plurality of pixels, and the level of intensity of the pixel with the lowest level of intensity, and
storing the differences as the light-amount correction values such that each of the differences is associated with the respective one of the pixels,
receiving, at a second time, a request to print the image data, the second time being after the first time; and
printing, at the second time, the image data by,
reading light-amount correction values from the memory;
correcting a pixel value of each of the plurality of pixels in the image data by, for each of the plurality of pixels, reducing the pixel value associated with the respective one of the pixels by a reduction rate equal to one of the light amount correction values associated with the respective one of the pixels; and
controlling the driver to cause each of the light emitting devices to emit light based on the image data for which a pixel value of each pixel has been corrected such that the level of intensity of each of the light emitting devices is equal to the lowest level of intensity among the light emitting devices.

10. A non-transitory computer-readable recording medium with an executable program stored thereon for controlling an image forming device, the image forming device including a charging device, an image bearer to be charged by the charging device, a light-emitting device array including a plurality of light emitting devices, and a driver configured to cause the light emitting devices to emit light to form a latent image on the image bearer, wherein the program is executable by a controller to configure the controller to perform:
storing, at a first time, light-amount correction values for each of light emitting devices in a memory by,
determining a pixel value of each pixel of a plurality of pixels in image data, the pixel value being a level of intensity of the pixel,
determining the level of intensity of the pixel with a lowest level of intensity among the plurality of pixels,
determining, for each of the plurality of pixels, differences between the level of intensity of a respective one of the plurality of pixels, and the level of intensity of the pixel with the lowest level of intensity, and
storing the differences as the light-amount correction values such that each of the differences is associated with the respective one of the pixels;
receiving, at a second time, a request to print the image data, the second time being after the first time; and
printing, at the second time, the image data by,
reading light-amount correction values from the memory;
correcting a pixel value of each of the plurality of pixels in the image data by, for each of the plurality of pixels, reducing the pixel value associated with the respective one of the pixels by a reduction rate equal to one of the light amount correction values associated with the respective one of the pixels; and
controlling the driver to cause each of the light emitting devices to emit light based on the image data for which a pixel value of each pixel has been corrected such that the level of intensity of each of the light emitting devices is equal to the lowest level of intensity among the light emitting devices.

* * * * *